United States Patent [19]
Nakayama et al.

[11] Patent Number: 5,768,218
[45] Date of Patent: Jun. 16, 1998

[54] MAGNETO-OPTICAL RECORDING MEDIUM HAVING A PLURALITY OF MAGNETIC LAYERS

[75] Inventors: Junichiro Nakayama, Shiki-gun; Yoshiteru Murakami, Nishinomiya; Junji Hirokane; Akira Takahashi, both of Nara, all of Japan

[73] Assignee: Sharp Kabushiki Kaisha, Osaka, Japan

[21] Appl. No.: 803,274

[22] Filed: Feb. 20, 1997

[30] Foreign Application Priority Data

Feb. 22, 1996 [JP] Japan ................ 8-034689

[51] Int. Cl.$^6$ .................................. G11B 11/00
[52] U.S. Cl. .................... 369/13; 428/694 ML; 428/694 EC
[58] Field of Search ............... 369/13, 14; 365/122; 360/59, 114; 428/694 ML, 694 MM, 694 RE, 694 EC

[56] References Cited

U.S. PATENT DOCUMENTS

| | | | |
|---|---|---|---|
| 5,428,585 | 6/1995 | Hirokane et al. | 369/13 |
| 5,554,436 | 9/1996 | Katayama et al. | 369/13 |
| 5,623,458 | 4/1997 | Matsumoto et al. | 369/13 |
| 5,631,096 | 5/1997 | Nakajima et al. | 369/13 |

*Primary Examiner*—Tan Dinh
*Attorney, Agent, or Firm*—David G. Conlin; Brian L. Michaelis

[57] ABSTRACT

A magneto-optical recording medium has a transparent substrate, a first magnetic layer, first intermediate layer, a second magnetic layer, and a third magnetic layer provided in this order. The first magnetic layer has an in-plane magnetization at room temperature, while a transition from the in-plane magnetization to a perpendicular magnetization occurs to the first magnetic layer with a temperature rise. The first intermediate layer is made of a non-magnetic substance. The second magnetic layer is a film having a perpendicular magnetization. The third magnetic layer is a film having a perpendicular magnetization, has a coercive force smaller than that of the second magnetic layer at room temperature, and has a Curie temperature higher than that of the second magnetic layer. The light intensity modulation overwriting method is applicable to the magneto-optical recording medium thus arranged, superior reproduction signal characteristics can be obtained with respect to this magneto-optical recording medium, and reproduction can be carried out with respect to the recording medium even though it has recording bits whose each diameter is smaller than that of a light beam. Thus it is possible to provide the magneto-optical recording medium suitable for high density recording.

24 Claims, 16 Drawing Sheets

MAGNETO-OPTICAL RECORDING MEDIUM HAVING A PLURALITY OF MAGNETIC LAYERS

FIELD OF THE INVENTION

The present invention relates to a magneto-optical recording medium, such as an optical disk, or an optical card, which carries out at least one of optical recording, reproduction, and erasion of information, and also relates to a magneto-optical recording method with respect to the magneto-optical recording medium.

BACKGROUND OF THE INVENTION

The magneto-optical recording method is a method for recording and reproducing, in a manner described below, to and from a recording medium composed of a substrate and a perpendicularly-magnetized film made of a magnetic substance which is provided on the substrate.

The recording operation begins with initialization of the recording medium by a strong external magnetic field or the like, whereby the magnetization of the recording medium is directed in one specific direction (either upward or downward). Thereafter, a laser beam is projected on an area where information is to be recorded, so that the area of the recording medium is heated to not lower than around a Curie temperature of the magnetic film or not lower than around a compensation temperature of the magnetic film. As a result, the heated area of the magnetic film has no coercive force (Hc), or substantially no coercive force (Hc). In this state, an external magnetic field (bias magnetic field) with a direction opposite to that for the initialization is applied so that the magnetization direction of the area is reversed. When the projection of the laser beam is suspended, the temperature of the recording medium falls to the room temperature, whereby the magnetization direction thus reversed is fixed. Thus, information is thermal-magnetically recorded.

For reproducing information, a linearly polarized laser beam is projected on the recording medium, so that optical reading-out of information is carried out by making use of a phenomenon that the plane of polarization of reflected light or transmitted light of the laser beam rotates in accordance with the magnetization direction (the magnetic Kerr effect, and the magnetic Faraday effect).

As a recording method, a so-called light intensity modulation overwriting method has been proposed. According to this method, overwriting by modulating the light intensity is carried out with respect to a recording medium which has a recording layer composed of two exchange-coupled films, with the use of an initializing magnetic field (Hi) and a recording magnetic field (Hw). The following description will discuss an overwriting method disclosed in the Japanese Publication of Unexamined Patent Application No. 63-316343/1988 (Tokukaisho No. 63-316343) as one type of the light intensity modulation overwriting method. According to this overwriting method, an overwriting operation is carried out with respect to a recording medium which has a second magnetic layer 25 and a third magnetic layer 26, and a eighth magnetic layer 29 therebetween as well, as shown in FIG. 18. The recording medium has the described configuration so that the initializing magnetic field (Hi) is allowed to be smaller and that the recording medium has superiority in the stability of recording bits.

FIG. 19 is a view illustrating states of respective magnetizations of the second magnetic layer 25, the third magnetic layer 26, and the eighth magnetic layer 29, wherein the horizontal axis indicates temperature. Since the layers are respectively made of rare earth-transition metal alloys, each has a total magnetization and respective sub-lattice magnetizations of the rare-earth metal and the transition metal. Arrows represent the respective directions of the transition metal sub-lattice magnetizations of the second, third, and eighth magnetic layers.

At room temperature, information is recorded with magnetization directions of the second magnetic layer 25, which are either upward (state "0") or downward (state "1"). Initialization is carried out by applying the initializing magnetic field Hi. As a result, as illustrated in FIG. 19, only the magnetization of the third magnetic layer 26 is directed in one specific direction (upward in the figure) while the magnetization direction of the second magnetic layer 25 is not reversed, since a strength of the initializing magnetic field Hi is set smaller than that of a coercive force of the second magnetic layer 25 at room temperature while greater than that of a coercive force of the third magnetic layer 26 at room temperature. The eighth magnetic layer 29 has an in-plane magnetic anisotropy at room temperature. Therefore, it has an effect of preventing exchange-coupling between the second magnetic layer 25 and the third magnetic layer 26.

Recording is carried out by applying the recording magnetic field Hw while projecting the laser beam whose light intensity is modulated either to a high power or a low power. The high power of the laser beam is set so that the projection of the high power laser beam causes the recording medium to be heated to the vicinity of a Curie temperature of the third magnetic layer 26. The low power of the laser beam is set so that the projection of the low power laser beam causes the recording medium to be heated to the vicinity of a Curie temperature of the second magnetic layer 25.

Therefore, with the projection of the high power laser beam, the magnetization of the third magnetic layer 26 is reversed downward by the recording magnetic field Hw, as illustrated in FIG. 19. The magnetization direction of the third magnetic layer 26 is copied, by the exchange coupling force exerted to an interface in the cooling process, to the eighth magnetic layer 29 having a perpendicular magnetic anisotropy, and then to the second magnetic layer 25. As a result, the magnetization of the second magnetic layer 25 is directed downward (state "1").

On the other hand, with the projection of the low power laser beam, the magnetization direction of the third magnetic layer 26 is not reversed by the recording magnetic field Hw, since in such a state a strength of the coercive force of the third magnetic layer 26 is greater than that of the recording magnetic field Hw. The magnetization of the second magnetic layer 25 is directed in the same direction as that of the magnetization of the third magnetic layer 26 by the exchange-coupling force exerted to the interface in the cooling process, as described above. Therefore, the magnetization of the second magnetic field 25 has an upward direction (state "0").

The reproduction-use laser power is set to a considerably lower level than that of the recording-use low power.

The following description will discuss an overwriting method disclosed in J. Appl. Phys. 67(9), 1990, p. 4415. According to the method, an overwriting operation is carried out with respect to a magneto-optical recording medium which has the second magnetic layer 25, the third magnetic layer 26, a ninth magnetic layer 30, and a tenth magnetic layer 31, as illustrated in FIG. 20, so that the initializing magnetic field Hi is unnecessary and so that the recording and reproducing can be carried out with a conventional device.

FIG. 21 illustrates changes in respective magnetization directions of the magnetic layers. At room temperature, information is recorded with magnetization directions of the second magnetic layer 25 which are either upward (state "0") or downward (state "1"). A magnetization of the tenth magnetic layer 31 is always directed in one specific direction (upward in the figure), while before a recording operation a magnetization of the third magnetic layer 26 is directed in the same direction as that of the tenth magnetic layer 31 by the intermediation of the ninth magnetic layer 30. In other words, the tenth magnetic layer 31 has a function of the initializing magnetic field described above.

Recording is carried out by applying the recording magnetic field Hw while projecting the laser beam whose light intensity is modulated either to a high power or a low power. Since this operation is the same as that illustrated in FIG. 19, a detailed description is omitted.

The foregoing conventional technologies have been capable of providing a magneto-optical recording medium to which the light intensity modulation overwriting method is applicable, which requires an initializing magnetic field which has a strength rather small, and which is superior in stability of recording bits. However, such problems also arise as: the first magnetic layer has a low Curie temperature and hence causes the magneto-optical recording medium to have inferior reproduction signal characteristics; and the magneto-optical recording medium is not suitable for high-density recording since reproduction is impossible with respect to recording bits having a diameter smaller than that of the light beam.

SUMMARY OF THE INVENTION

The object of the present invention is to provide a magneto-optical recording medium (1) to which the light intensity modulation overwriting method is applicable, (2) whose reproduction signal characteristics are superior, and (3) to which reproduction can be carried out even though having recording bits whose each diameter is smaller than that of a light beam so that the magneto-optical recording medium is suitable for high-density recording.

To achieve the above object, the magneto-optical recording medium of the present invention is characterized in comprising (1) a transparent substrate, (2) a first magnetic layer having an in-plane magnetization at room temperature, while coming to have a perpendicular magnetization with a temperature rise, (3) a first intermediate layer made of a non-magnetic substance, (4) a second magnetic layer having a perpendicular magnetization, and (5) a third magnetic layer having a perpendicular magnetization, having a coercive force smaller than that of the second magnetic layer at room temperature, and having a Curie temperature higher than that of the second magnetic layer, wherein the first magnetic layer, the first intermediate layer, the second magnetic layer, and the third magnetic layer are provided in this order on the transparent substrate.

With the above-described arrangement, it is possible to provide a magneto-optical recording medium to which the light intensity modulation overwriting method is applicable, whose reproduction signal characteristics are superior, with respect to which reproduction can be carried out even though having recording bits whose each diameter is smaller than that of the light beam, and hence, which is suitable for the high-density recording.

It is preferable that the second magnetic layer and the third magnetic layer are respectively made of rare earth-transition metal alloys and have ferrimagnetism, and that the second magnetic layer and the third magnetic layer have reverse polarities to each other at a temperature to which an area of the magneto-optical recording medium is heated so that information is reproduced from the heated area.

It is preferable that the first intermediate layer is either made of a transparent dielectric substance, made of a light reflecting metal, or composed of a layer made of a transparent dielectric substance and a layer made of a light reflecting metal.

It is preferable that between the second magnetic layer and the third magnetic layer, there is provided either (1) a fourth magnetic layer having a Curie temperature higher than that of the second magnetic layer, (2) a fifth magnetic layer having an in-plane magnetization at room temperature and coming to have a perpendicular magnetization with a temperature rise, (3) a second intermediate layer made of a non-magnetic substance, or (4) an interface layer made of either a transition metal or a rare-earth metal.

It is preferable that a sixth magnetic layer and a seventh magnetic layer are provided, the sixth magnetic layer having a Curie temperature lower than that of the seventh magnetic layer, the third magnetic layer having a first and second surfaces, the sixth and seventh magnetic layers being provided on a side of the first surface while the second magnetic layer being provided on a side of the second surface.

For a fuller understanding of the nature and advantages of the invention, reference should be made to the ensuing detailed description taken in conjunction with the accompanying drawings.

DESCRIPTION OF THE PREFERRED EMBODIMENTS

The following description will discuss an embodiment of the present invention, while referring to FIGS. 1 through 4.

Figure 1:
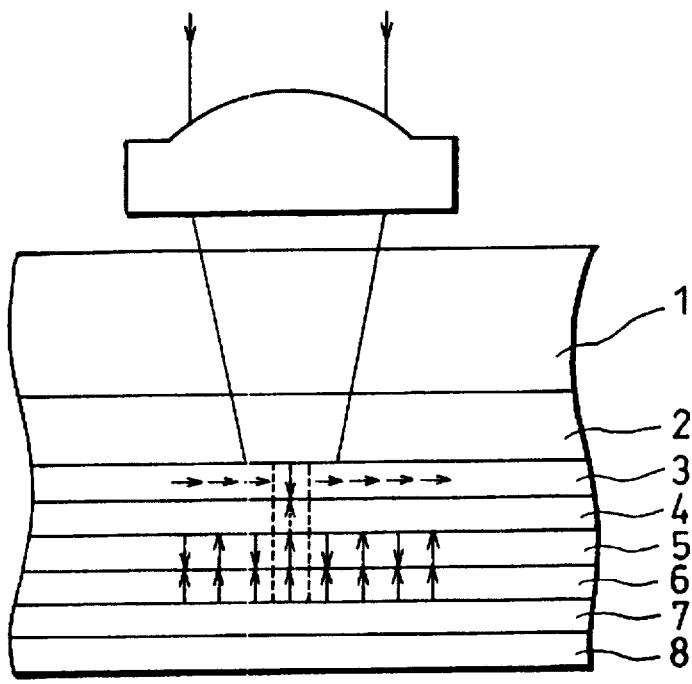
FIG. 1 is a view illustrating a schematic arrangement of a magneto-optical recording medium in accordance with first through third embodiments of the present invention, and states of magnetizations of the magneto-optical recording medium.

A magneto-optical recording medium of the present embodiment includes a transparent substrate 1. On the transparent substrate 1, there are provided a transparent dielectric layer 2, a first magnetic layer 3, a first intermediate layer 4, a second magnetic layer 5, a third magnetic layer 6, a protective layer 7, and an overcoat layer 8, which are laminated in this order, as shown in FIG. 1.

Figure 2:
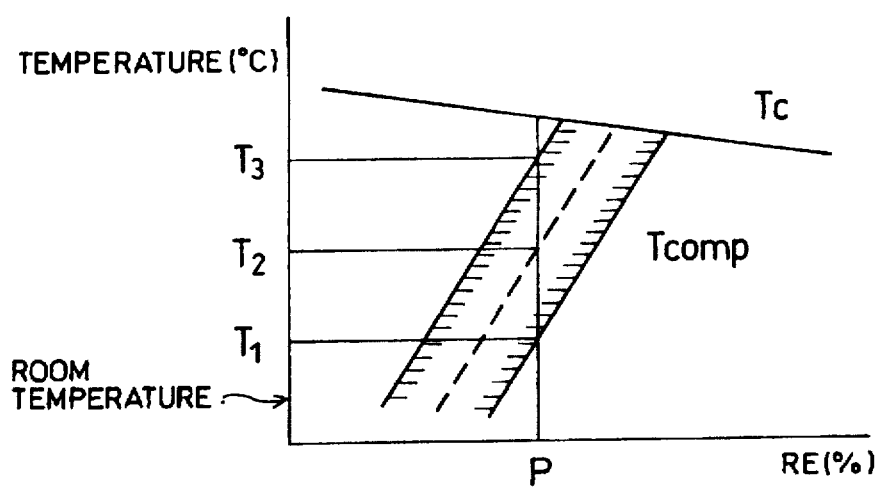
FIG. 2 is a graph illustrating a correlation among a composition, a Curie temperature, and a compensation temperature, of a first magnetic layer of the magneto-optical recording medium shown in FIG. 1.

FIG. 2 illustrates magnetization states of the first magnetic layer 3. The first magnetic layer 3 is made of a rare earth-transition metal alloy. The first magnetic layer 3 has a perpendicular magnetization, below a Curie temperature ($T_c$) thereof, in the vicinity (in a hatched region in the graph of the figure) of a compensation temperature ($T_{comp}$), at which a magnetic moment of the rare-earth metal and that of the transition metal are in equilibrium. At other temperatures, that is, in the other regions of the graph, the first magnetic layer 3 has an in-plane magnetization. The magnetic moments of the rare-earth metal and the transition metal differ in temperature characteristics. At high temperatures, the magnetic moment of the transition metal becomes greater than that of the rare-earth metal.

Therefore, the first magnetic layer 3 is made of an alloy having a composition (indicated by P in the figure) in which the rare-earth metal has a greater share compared with a composition wherein a compensation temperature coincides with room temperature. The alloy of this composition exhibits an in-plane magnetization at room temperature. On the other hand, at a temperature not lower than a predetermined temperature, the alloy has a perpendicular magnetization, since the magnetic moment of the transition metal relatively augments and the magnetic moments of the rare-earth metal and the transition metal become in equilibrium. In short, the first magnetic layer 3 has an in-plane magnetization in a temperature range from room temperature to a temperature $T_1$, a perpendicular magnetization in a temperature range from a temperature $T_2$ to a temperature $T_3$, and an in-plane magnetization in a temperature range from a temperature $T_3$ to the Curie temperature $T_c$.

When, during a reproducing operation, a reproduction-use light beam is projected from a side of the substrate 1 through a convergent lens onto the first magnetic layer 3 of the magneto-optical recording medium having the above arrangement, a portion of the first magnetic layer 3 which corresponds to the vicinity of a center of the reproduction-use light beam has a temperature rise, thereby coming to have the temperature $T_1$. This is because the reproduction-use light beam is converged by the convergent lens to a diffraction limit and has a Gaussian light intensity distribution, thereby causing the first magnetic layer 3 to have a substantial Gaussian temperature distribution. Therefore, the portion of the first magnetic layer 3 having the temperature $T_1$ has a diameter smaller than that of the reproduction-use light beam. In the first magnetic layer 3, the portion which corresponds to the vicinity of the center of the reproduction-use light beam and hence has the temperature $T_1$ has a perpendicular magnetization thereby exhibiting a magneto-optical Kerr effect, whereas the other part does not have a temperature rise and hence has an in-plane magnetization, thereby exhibiting substantially no magneto-optical Kerr effect.

Here, in the case where information is recorded in the second magnetic layer 5 as shown in FIG. 1, information is copied only to the portion of the first magnetic layer 3 having a temperature not lower than the temperature $T_1$ due to a magnetic field generated by the second magnetic layer 5. Therefore, it is possible to reproduce information from a recording bit having a diameter smaller than that of the reproduction-use light beam, thereby resulting in drastic improvement of the recording density.

Regarding a recording operation, overwriting is carried out by modulating a light intensity while selectively applying an initializing magnetic field (Hi) and a recording magnetic field (Hw).

Figure 3:
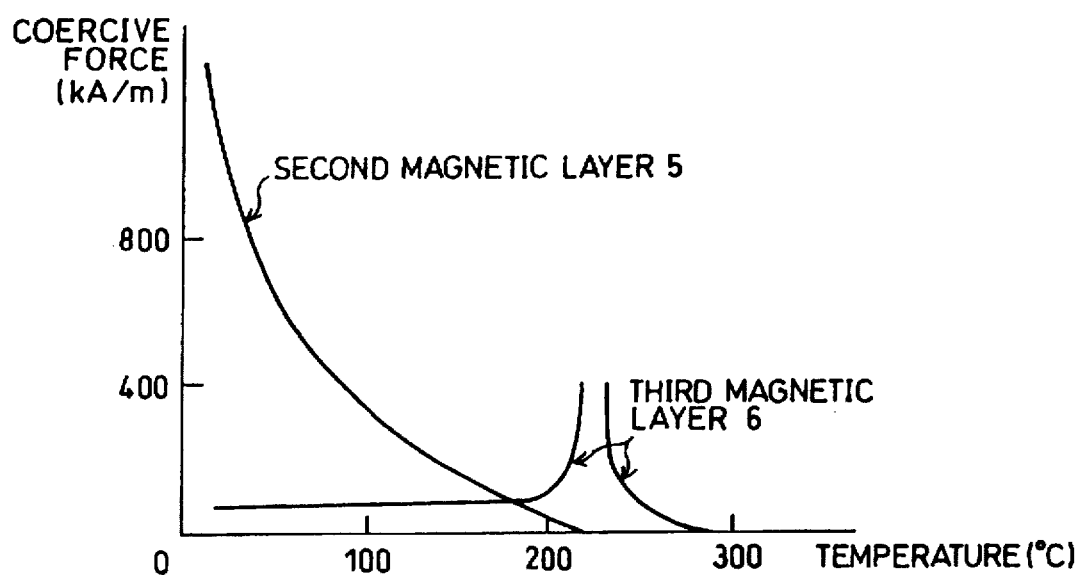
FIG. 3 is a graph illustrating correlations between temperature and respective coercive forces regarding a second magnetic layer and a third magnetic layer of the magneto-optical recording medium illustrated in FIG. 1.
Figure 4:
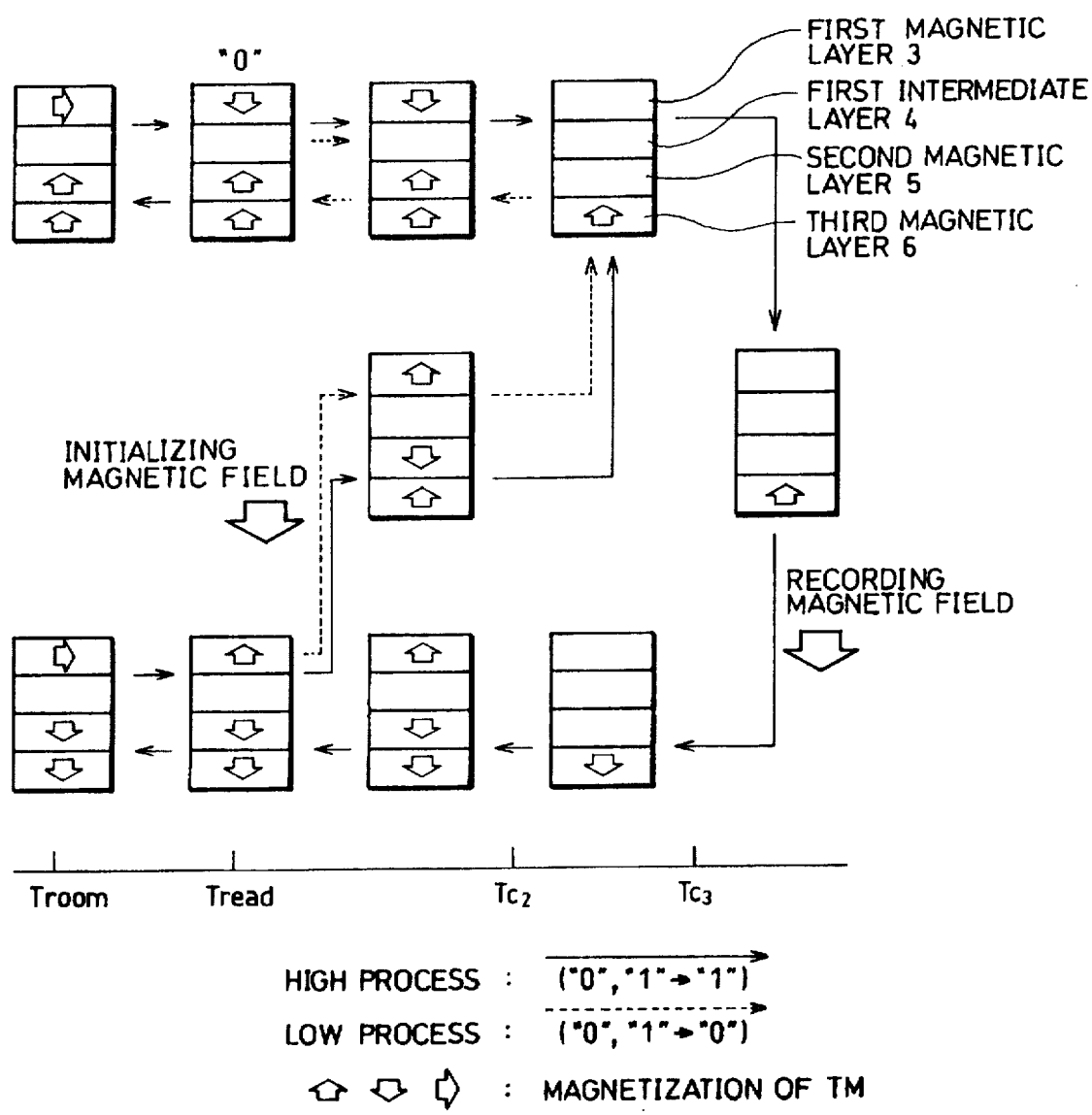
FIG. 4 is a view illustrating states of magnetizations of the respective magnetic layers of the magneto-optical recording medium shown in FIG. 1, for showing steps of a recording process with respect to the magneto-optical recording medium.

FIG. 3 illustrates respective correlations between temperatures and coercive forces concerning the second magnetic layer 5 and the third magnetic layer 6, and FIG. 4 illustrates of states of respective magnetizations of the first magnetic layer 3, the second magnetic layer 5, and the third magnetic layer 6, wherein the horizontal axis indicates temperature. Since the layers are rare earth-transition metal alloys, each has a total magnetization and respective sub-lattice magnetizations of the rare-earth metal and the transition metal. Arrows represent the respective directions of the transition metal sub-lattice magnetizations of these magnetic layers.

At room temperature, information is recorded with magnetization directions of the second magnetic layer 5, which are either upward (state "0") or downward (state "1"). As illustrated in FIG. 4, initialization is carried out by applying the initializing magnetic field Hi so that only the magnetization of the third magnetic layer 6 is directed in one specific direction (upward in the figure). Since a strength of the initializing magnetic field Hi is smaller than that of a coercive force of the second magnetic layer 5 at room temperature while greater than that of a coercive force of the third magnetic layer 6 at room temperature, the magnetization direction of the second magnetic layer 5 is not reversed.

Recording is carried out by applying the recording magnetic field Hw while projecting the laser beam whose light intensity is modulated either to a high power (Ph) or a low power (Pl). The high power of the laser beam is set so that the projection of the high power laser beam causes the medium irradiated to be heated to the vicinity of a Curie temperature of the third magnetic layer 6. The low power of the laser beam is set so that the projection of the low power laser beam causes the medium irradiated to be heated to the vicinity of a Curie temperature of the second magnetic layer 5.

Therefore, with the projection of the high power laser beam, the magnetization direction of the third magnetic layer 6 is reversed downward by the recording magnetic field Hw, as illustrated in FIG. 4. The magnetization direction of the third magnetic layer 6 is copied, by an exchange coupling force exerted to an interface in the cooling process, to the second magnetic layer 5. As a result, the magnetization of the second magnetic layer 5 has a downward direction (state "1").

On the other hand, with the projection of the low power laser beam, the magnetization direction of the third magnetic layer 6 is not reversed by the recording magnetic field Hw, since in such a state a strength of the coercive force of the third magnetic layer 6 is greater than that of the recording magnetic field Hw. The magnetization of the second magnetic layer 5 is directed in the same direction as that of the magnetization of the third magnetic layer 6 by the exchange-coupling force exerted to the interface in the cooling process. Therefore, the magnetization of the second magnetic field 5 has an upward direction (state "0").

Furthermore, since the first magnetic layer 3 and the first intermediate layer 4 are provided in the magneto-optical recording medium of the present embodiment, the light intensity modulation overwriting is more smoothly carried out, as is the case with the conventional magneto-optical recording medium in which the eighth magnetic layer 29 is provided.

The following description will discuss a magneto-optical disk of sample #1 as an example of the above-described magneto-optical recording medium. The magneto-optical disk of sample #1 has a disk-shaped transparent substrate 1 made of glass, which has an outer diameter of 86 mm and an inner diameter of 15 mm, and a thickness of 1.2 mm. A concave-convex guide track for guiding the light beam is provided directly on a surface of the substrate 1 by the reactive ion etching method. The guide track has a track pitch of 1.6 µm, a groove width of 0.8 µm, and a land width of 0.8 µm.

On the surface of the substrate 1 where the guide track is formed, a dielectric layer 2 with a thickness of 70 nm, a first magnetic layer 3 with a thickness of 20 nm, a first intermediate layer 4 with a thickness of 20 nm, a second magnetic layer 5 with a thickness of 50 nm, a third magnetic layer 6 with a thickness of 100 nm, and a protective layer 7 with a thickness of 30 nm are laminated in this order. The dielectric layer 2, made of AlN, was formed by the reactive sputtering method. The first magnetic layer 3, made of GdFeCo, was formed by the simultaneous sputtering method using Gd, Fe, and Co targets. The first intermediate layer 4, made of AlN, was formed by the reactive sputtering method. The second magnetic layer 5, made of TbFeCo, was formed by the simultaneous sputtering method using Tb, Fe, and Co targets. The third magnetic layer 6, made of TbFeCo, was formed by the simultaneous sputtering method using Tb, Fe, and Co targets. The protective layer 7 is made of AlN.

Sputtering conditions for forming the first magnetic layer 3, the second magnetic layer 5, and the third magnetic layer 6 were as follows:

ultimate vacuum $\leq 2.0 \times 10^{-4}$ Pa;

argon gas pressure=$6.5 \times 10^{-1}$ Pa; and discharge power=300 W.

Sputtering conditions of the dielectric layer 2, the first intermediate layer 4, and the protective layer 7 were as follows:

ultimate vacuum $\leq 2.0 \times 10^{-4}$ Pa;

nitrogen gas pressure=$3.0 - 10^{-1}$ Pa; and discharge power=800 W.

An acrylic ultraviolet ray hardening resin was provided over the protective layer 7, and it was hardened with the projection of an ultraviolet ray, so that an overcoat film 8 was provided.

The first magnetic layer 3 of the magneto-optical disk of sample #1 is rare-earth metal rich and has the following properties:

Curie temperature $Tc_1 \leq 300°$ C.;

having an in-plane magnetization at room temperature; and a transition from the in-plane magnetization to a perpendicular magnetization occurs at around 140° C.

The second magnetic layer 5 of the magneto-optical disk of sample #1 is transition metal rich and has the following properties:

Curie temperature $Tc_3 = 230°$ C.; and coercive force $Hc_2$ at room temperature=1200 kA/m.

The third magnetic layer 6 of the magneto-optical disk of sample #1 is rare-earth metal rich, and has the following properties:

Curie temperature $Tc_3 = 280°$ C.;

compensation temperature $T_{comp3} = 230°$ C.; and coercive force $Hc_3$ at room temperature=160 kA/m.

A recording operation was carried out with respect to the magneto-optical disk of sample #1, under the following conditions, so as to make clear a correlation between the reproduction-use laser power Pr and a carrier-to-noise ratio (C/N):

strength of initializing magnetic field Hi=240 kA/m;
  strength of recording magnetic field Hw=32 kA/m;
  high power Ph of laser beam=10 mW;
  low power Pl of laser beam=5 mW; and
  recording bit length=0.5 μm.

As a result, the carrier-to-noise ratio C/N not lower than 45 dB was obtained when the reproduction-use laser power Pr fell in a range from 2 to 3.5 mW. With this laser power, the first magnetic layer 3 had a temperature not lower than the temperature $T_1$, and had a perpendicular magnetization while exhibited the magneto-optical Kerr effect. When the reproduction-use laser power Pr was not greater than 2 mW, the first magnetic layer 3 had a temperature lower than the temperature $T_1$, and had an in-plane magnetization while did not exhibit the magneto-optical Kerr effect. High temperature-high humidity resistance of the magneto-optical disk of sample #1 was also checked, and it was found that there was no problem about its liability.

Figure 18:
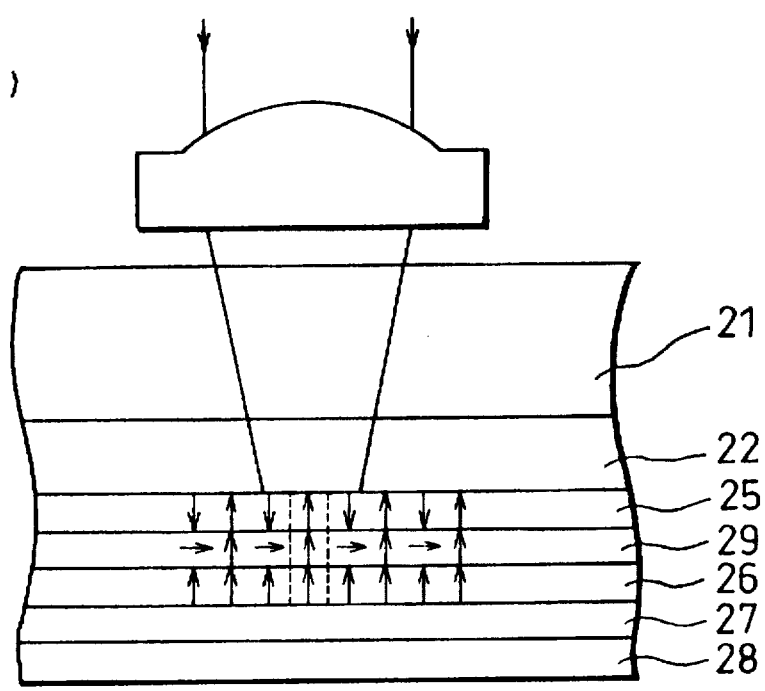
FIG. 18 is a view illustrating a schematic arrangement of a conventional magneto-optical recording medium, and states of magnetizations of the magneto-optical recording medium during a reproducing operation.
Figure 19:
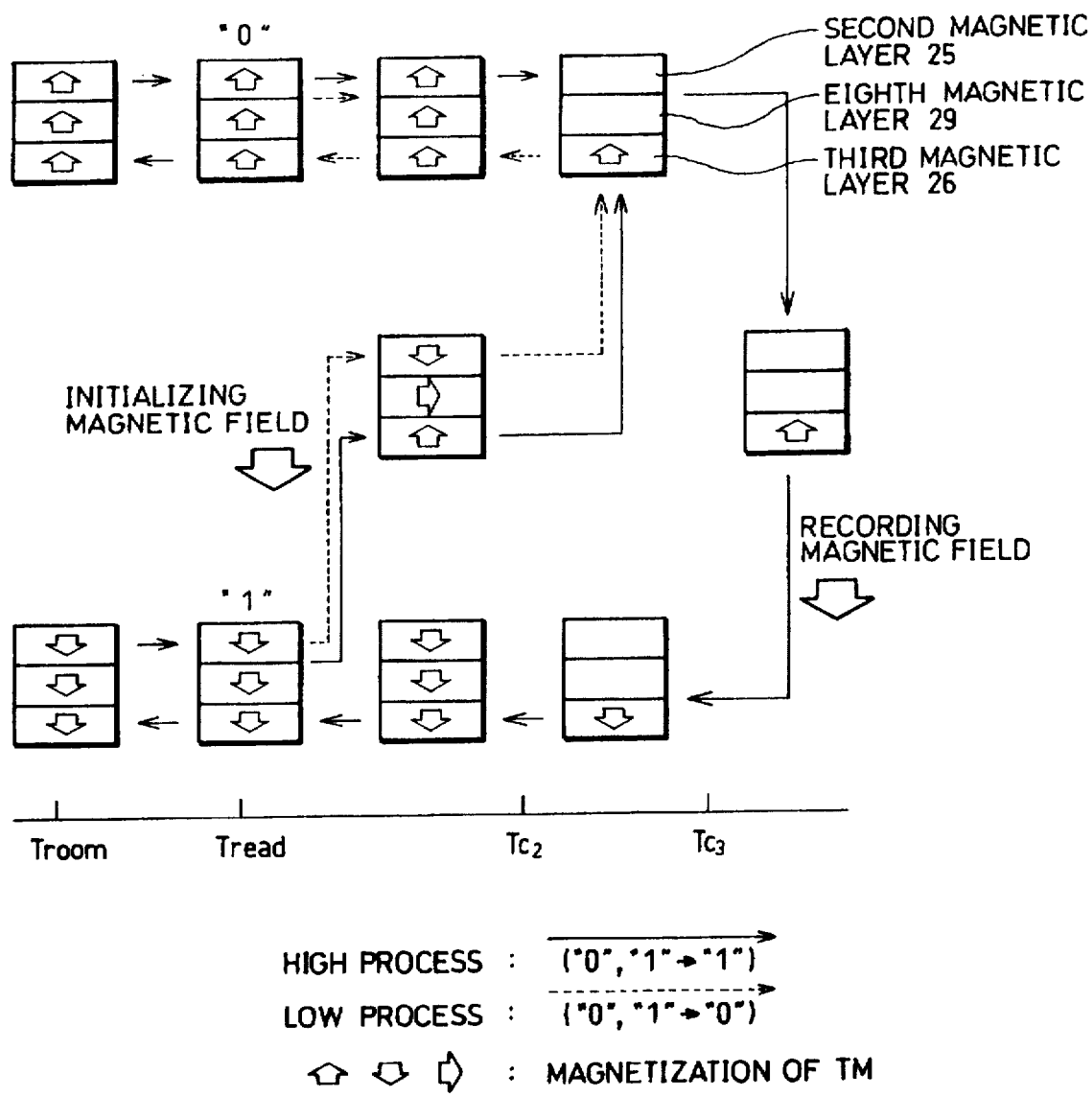
FIG. 19 is a view illustrating states of magnetizations of respective magnetic layers of the magneto-optical recording medium shown in FIG. 18, for showing steps of a recording process with respect to the magneto-optical recording medium.
Figure 20:
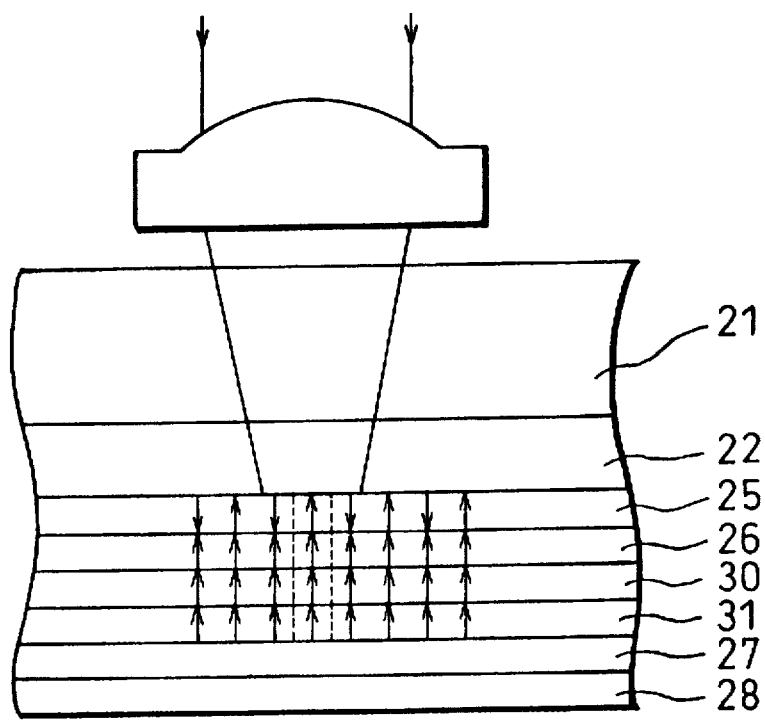
FIG. 20 is a view illustrating a schematic arrangement of another conventional magneto-optical recording medium, and states of magnetizations of the magneto-optical recording medium during a reproducing operation.
Figure 21:
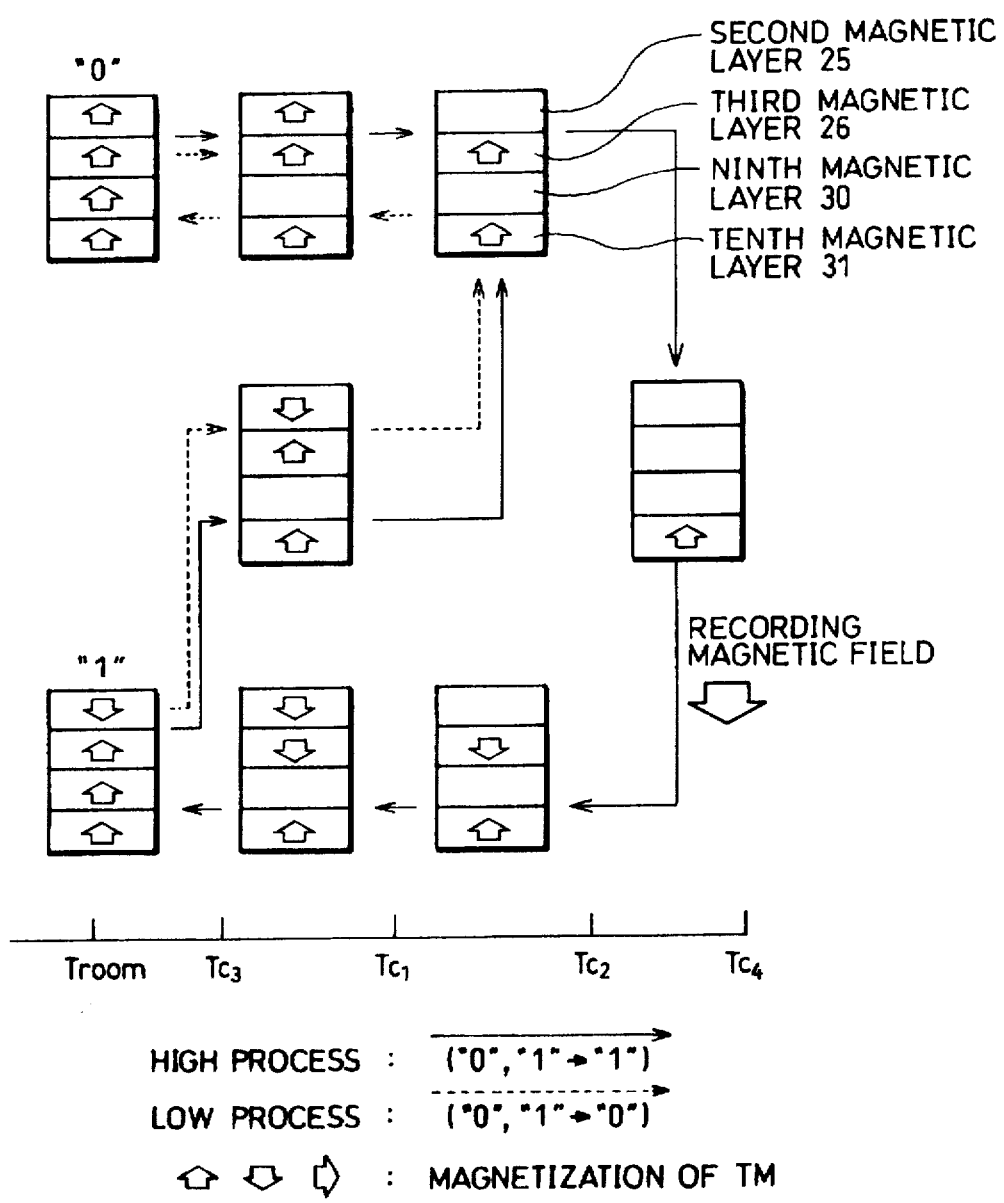
FIG. 21 is a view illustrating states of magnetizations of respective magnetic layers of the magneto-optical recording medium shown in FIG. 20, for showing steps of a recording process with respect to the magneto-optical recording medium.

Then, a recording operation was carried out with respect to a conventional magneto-optical disk shown in FIG. 18, under the following conditions, so as to make clear a correlation between the reproduction-use laser power Pr and the carrier-to-noise ratio C/N:

strength of initializing magnetic field Hi=240 kA/m;
  strength of recording magnetic field Hw=40 kA/m;
  high power Ph of laser beam=10 mW;
  low power Pl of laser beam=6 mW; and
  recording bit length=0.5 μm.

As a result, a greater strength of the recording magnetic field and a greater intensity of the low power laser beam were needed, compared with the magneto-optical disk of sample #1. In other words, the conventional magneto-optical disk had sensitivity inferior to the magneto-optical disk of sample #1 with respect to the recording magnetic field Hw and the low power laser beam. Besides, the carrier-to-noise ratio C/N was below 45 dB when the reproduction-use laser power Pr fell in a range from 2 to 3.5 mW. Thus, it was found that the conventional magneto-optical disk was not suitable for high density recording.

The following description will discuss a second embodiment of the present invention, while referring to FIG. 1.

A magneto-optical recording medium of the present embodiment (hereinafter referred to as magneto-optical disk of sample #2) has the same configuration as that of sample #1 except for the first intermediate layer 4. Namely, the magneto-optical disk of sample #2 has the same transparent substrate 1, dielectric layer 2, first magnetic layer 3, second magnetic layer 5, third magnetic layer 6, protective layer 7, and overcoat layer 8 as those of the magneto-optical disk of sample #1. The following description will depict the magneto-optical disk of sample #2, as an example of the magneto-optical recording medium of the present embodiment.

The first intermediate layer 4, which is made of Al and has a thickness of 20 nm, was formed by the sputtering method using an Al target, under the following conditions:

ultimate vacuum≦$2.0\times10^{-4}$ Pa;
  argon gas pressure=$6.5\times10^{-1}$ Pa; and
  discharge power=300 W.

A recording operation was carried out with respect to the magneto-optical disk of sample #2, under the following conditions, so as to make clear a correlation between the reproduction-use laser power Pr and the carrier-to-noise ratio C/N:

strength of initializing magnetic field Hi=240 kA/m;
  strength of recording magnetic field Hw=32 kA/m;
  high power Ph of laser beam=10 mW;
  low power Pl of laser beam=5 mW; and
  recording bit length=0.5 μm.

As a result, the carrier-to-noise ratio C/N not lower than 45 dB was obtained when the reproduction-use laser power Pr fell in a range from 2 to 3.5 mW. Besides, a period of time spent in forming the first intermediate layer 4 was one sixth of that in the case of the magneto-optical disk of sample #1. Thus, production efficiency was improved.

The following description will discuss a third embodiment of the present invention, while referring to FIG. 1.

A magneto-optical recording medium of the present embodiment (hereinafter referred to as magneto-optical disk of sample #3) has the same configuration as that of sample #1 except for the first intermediate layer 4. Namely, the magneto-optical disk of sample #3 has the same transparent substrate 1, dielectric layer 2, first magnetic layer 3, second magnetic layer 5, third magnetic layer 6, protective layer 7, and overcoat layer 8 as those of the magneto-optical disk of sample #1. The following description will depict the magneto-optical disk of sample #3, as an example of the magneto-optical recording medium of the present embodiment.

The first intermediate layer 4 is composed of an AlN film having a thickness of 20 nm and an Al film having a thickness of 20 nm, which are laminated on each other. The AlN film was formed by the reactive sputtering method, under the following conditions:

ultimate vacuum≦$2.0\times10^{-4}$ Pa;
  argon gas pressure=$6.5\times10^{-1}$ Pa; and
  discharge power=300 W.

The Al film was formed by the sputtering method using an Al target, under the following conditions:

ultimate vacuum=not more than $2.0\times10^{-4}$ Pa;
  nitrogen gas pressure=$3.0\times10^{-1}$ Pa; and
  discharge power=800 W.

A recording operation was carried out with respect to the magneto-optical disk of sample #3, under the following conditions, so as to make clear a correlation between the reproduction-use laser power Pr and the carrier-to-noise ratio C/N:

strength of initializing magnetic field Hi=240 kA/m;
  strength of recording magnetic field Hw=32 kA/m;
  high power Ph of laser beam=10 mW;
  low power Pl of laser beam=5 mW; and
  recording bit length=0.5 μm.

As a result, the carrier-to-noise ratio C/N not lower than 45.5 dB was obtained when the reproduction-use laser power Pr fell in a range from 2 to 3.5 mW. Besides, reproduction signal characteristics were improved, compared with the magneto-optical disk of sample #1.

Figure 5:
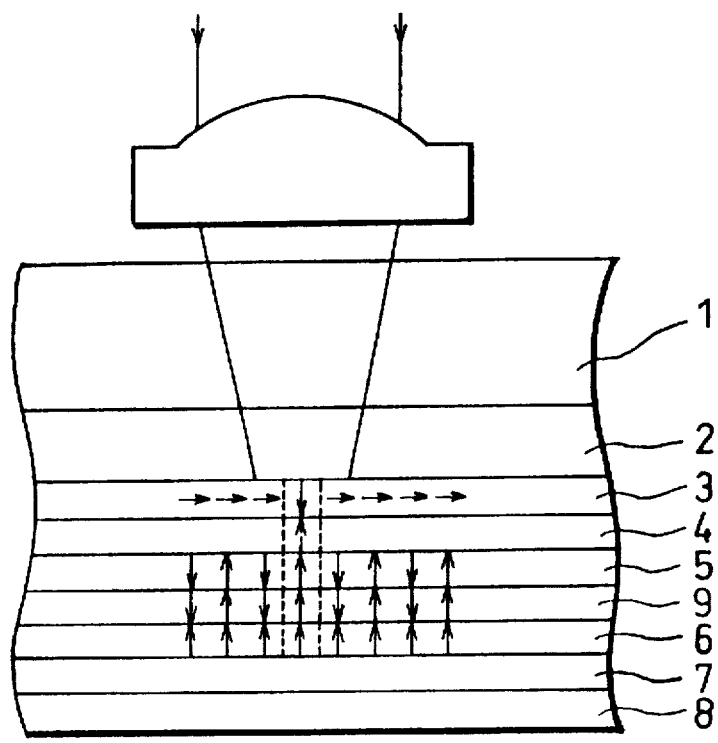
FIG. 5 is a view illustrating a schematic arrangement of a magneto-optical recording medium in accordance with a fourth embodiment of the present invention, and states of magnetizations of the magneto-optical recording medium during a reproducing operation.

The following description will discuss a fourth embodiment of the present invention, while referring to FIG. 5.

A magneto-optical recording medium of the present embodiment (hereinafter referred to as magneto-optical disk of sample #4) has the same configuration as that of sample #1, except for a fourth magnetic layer 9. Namely, the magneto-optical disk of sample #4 has the same transparent substrate 1, dielectric layer 2, first magnetic layer 3, first intermediate layer 4, second magnetic layer 5, third magnetic layer 6, protective layer 7, and overcoat layer 8 as those of the magneto-optical disk of sample #1. The following description will depict the magneto-optical disk of sample #4, as an example of the magneto-optical recording medium of the present embodiment.

The fourth magnetic layer 9, which is made of GdFeCo and has a thickness of 50 nm, was formed by the simultaneous sputtering method using Gd, Fe, and Co targets, under the following conditions:

ultimate vacuum $\leq 2.0 \times 10^{-4}$ Pa;

argon gas pressure=$6.5 \times 10^{-1}$ Pa; and discharge power=300 W.

The fourth magnetic layer 9 is rare-earth metal rich, and has the following properties:

Curie temperature $Tc_4 > 300°$ C.;

compensation temperature $T_{comp4}=150°$ C.; and coercive force $Hc_4$ at room temperature=24 kA/m.

A recording operation was carried out with respect to the magneto-optical disk of sample #4, under the following conditions, so as to make clear a correlation between the reproduction-use laser power Pr and the carrier-to-noise ratio C/N:

strength of initializing magnetic field Hi=240 kA/m;

strength of recording magnetic field Hw=24 kA/m;

high power Ph of laser beam=10 mW;

low power Pl of laser beam=5 mW; and recording bit length=0.5 µm.

As a result, the carrier-to-noise ratio C/N not lower than 45 dB was obtained when the reproduction-use laser power Pr fell in a range from 2 to 3.5 mW. Besides, the satisfactory result was obtained with the recording magnetic field Hw having a smaller strength, compared with the magneto-optical disks of sample #1, sample #2, and sample #3.

Figure 6:
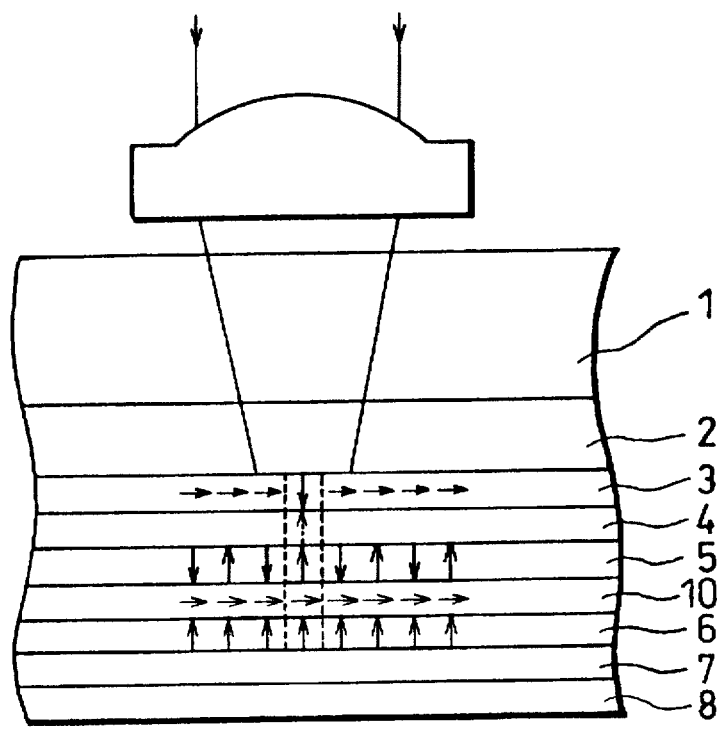
FIG. 6 is a view illustrating a schematic arrangement of a magneto-optical recording medium in accordance with a fifth embodiment of the present invention, and states of magnetizations of the magneto-optical recording medium during a reproducing operation.

The following description will discuss a fifth embodiment of the present invention, while referring to FIG. 6.

A magneto-optical recording medium of the present embodiment (hereinafter referred to as magneto-optical disk of sample #5) has the same configuration as that of sample #1, except for a fifth magnetic layer 10. Namely, the magneto-optical disk of sample #5 has the same transparent substrate 1, dielectric layer 2, first magnetic layer 3, first intermediate layer 4, second magnetic layer 5, third magnetic layer 6, protective layer 7, and overcoat layer 8 as those of the magneto-optical disk of sample #1. The following description will depict the magneto-optical disk of sample #5, as an example of the magneto-optical recording medium of the present embodiment.

The fifth magnetic layer 10, which is made of GdFeCo and has a thickness of 50 nm, was formed by the simultaneous sputtering method using Gd, Fe, and Co targets, under the following conditions:

ultimate vacuum $\leq 2.0 \times 10^{-4}$ Pa;

argon gas pressure=$6.5 \times 10^{-1}$ Pa; and discharge power=300 W.

The fifth magnetic layer 10 is rare-earth metal rich, and has the following properties:

Curie temperature $Tc_5 > 300°$ C.;

compensation temperature $T_{comp5}=250°$ C.; and having an in-plane magnetization at room temperature.

A recording operation was carried out with respect to the magneto-optical disk of sample #5, under the following conditions, so as to make clear a correlation between the reproduction-use laser power Pr and the carrier-to-noise ratio C/N:

strength of initializing magnetic field Hi=200 kA/m;

strength of recording magnetic field Hw=24 kA/m;

high power Ph of laser beam=10 mW;

low power Pl of laser beam=5 mW; and recording bit length=0.5 µm.

As a result, the carrier-to-noise ratio C/N not lower than 45 dB was obtained when the reproduction-use laser power Pr fell in a range from 2 to 3.5 mW. Besides, the satisfactory result was obtained with the recording magnetic field Hw and the initializing magnetic field Hi having smaller strengths, compared with the magneto-optical disks of samples #1, #2, and #3.

Figure 7:
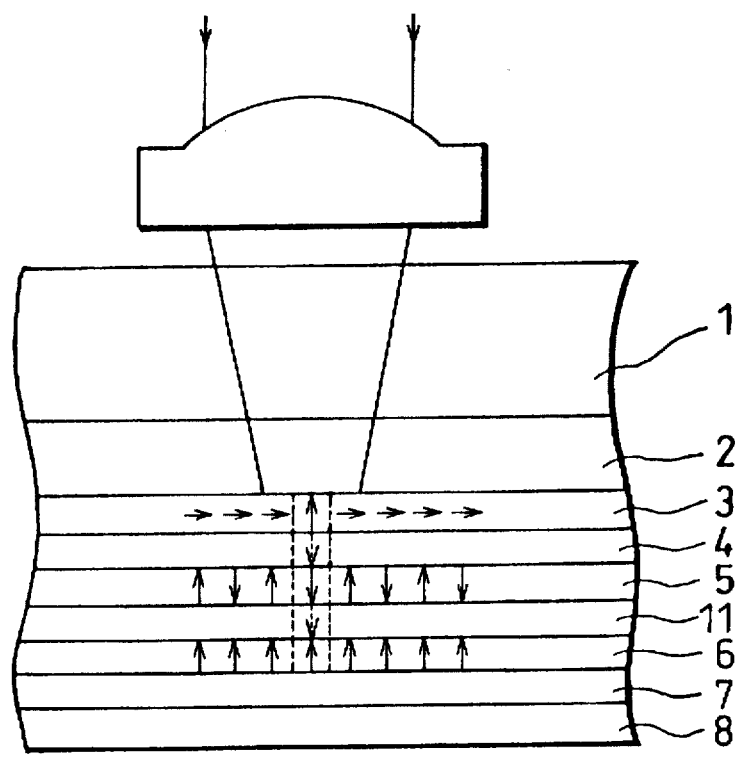
FIG. 7 is a view illustrating a schematic arrangement of a magneto-optical recording medium in accordance with a sixth embodiment of the present invention, and states of magnetizations of the magneto-optical recording medium during a reproducing operation.

The following description will discuss a sixth embodiment of the present invention, while referring to FIG. 7.

A magneto-optical recording medium of the present embodiment (hereinafter referred to as magneto-optical disk of sample #6) has the same configuration as that of sample #1 except for a second intermediate layer 11. Namely, the magneto-optical disk of sample #6 has the same transparent substrate 1, dielectric layer 2, first magnetic layer 3, first intermediate layer 4, second magnetic layer 5, third magnetic layer 6, protective layer 7, and overcoat layer 8 as those of the magneto-optical disk of sample #1. The following description will depict the magneto-optical disk of sample #6, as an example of the magneto-optical recording medium of the present embodiment.

The second intermediate layer 11, which is made of AlN and has a thickness of 10 nm, was formed by the reactive sputtering method, under the following conditions:

ultimate vacuum $\leq 2.0 \times 10^{-4}$ Pa;

nitrogen gas pressure=$3.0 \times 10^{-1}$ Pa; and discharge power=800 W.

A recording operation was carried out with respect to the magneto-optical disk of sample #6, under the following conditions, so as to make clear a correlation between the reproduction-use laser power Pr and the carrier-to-noise ratio C/N:

strength of initializing magnetic field Hi=240 kA/m;

strength of recording magnetic field Hw=24 kA/m;

high power Ph of laser beam=9 mW;

low power Pl of laser beam=4 mW; and recording bit length=0.5 µm.

As a result, the carrier-to-noise ratio C/N not lower than 45 dB was obtained when the reproduction-use laser power Pr fell in a range from 2 to 3.5 mW. Besides, the satisfactory result was obtained with the recording magnetic field Hw having a smaller strength and with the laser beam having a lower intensity, compared with the magneto-optical disks of samples #1, #2, and #3.

Figure 8:
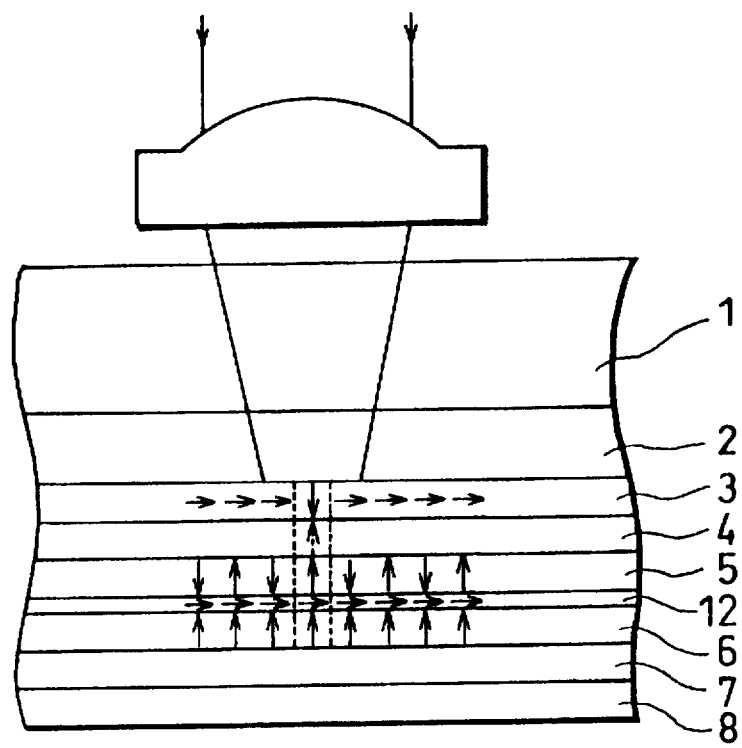
FIG. 8 is a view illustrating a schematic arrangement of a magneto-optical recording medium in accordance with a seventh embodiment of the present invention, and states of magnetizations of the magneto-optical recording medium during a reproducing operation.

The following description will discuss a seventh embodiment of the present invention, while referring to FIG. 8.

A magneto-optical recording medium of the present embodiment (hereinafter referred to as magneto-optical disk of sample #7) has the same configuration as that of sample #1 except for an interface layer 12. Namely, the magneto-optical disk of sample #7 has the same transparent substrate 1, dielectric layer 2, first magnetic layer 3, first intermediate layer 4, second magnetic layer 5, third magnetic layer 6, protective layer 7, and overcoat layer 8 as those of the magneto-optical disk of sample #1. The following description will depict the magneto-optical disk of sample #7, as an example of the magneto-optical recording medium of the present embodiment.

The interface layer 12, which is made of either Gd or Fe and has a thickness of 1 nm, was formed by the sputtering method using either a Gd target or an Fe target, under the following conditions:

ultimate vacuum$\leq 2.0\times 10^{-4}$ Pa;

argon gas pressure=$6.5\times 10^{-1}$ Pa; and discharge power=300 W.

A recording operation was carried out with respect to the magneto-optical disk of sample #7, under the following conditions, so as to make clear a correlation between the reproduction-use laser power Pr and the carrier-to-noise ratio C/N:

strength of initializing magnetic field Hi=240 kA/m;

strength of recording magnetic field Hw=24 kA/m;

high power Ph of laser beam=9 mW;

low power Pl of laser beam=4 mW; and recording bit length=0.5 μm.

As a result, the carrier-to-noise ratio C/N not lower than 45 dB was obtained when the reproduction-use laser power Pr fell in a range from 2 to 3.5 mW. Besides, the satisfactory result was obtained with the recording magnetic field Hw having a smaller strength and with the laser beam having a lower intensity, compared with the magneto-optical disks of samples #1, #2, and #3.

Figure 9:
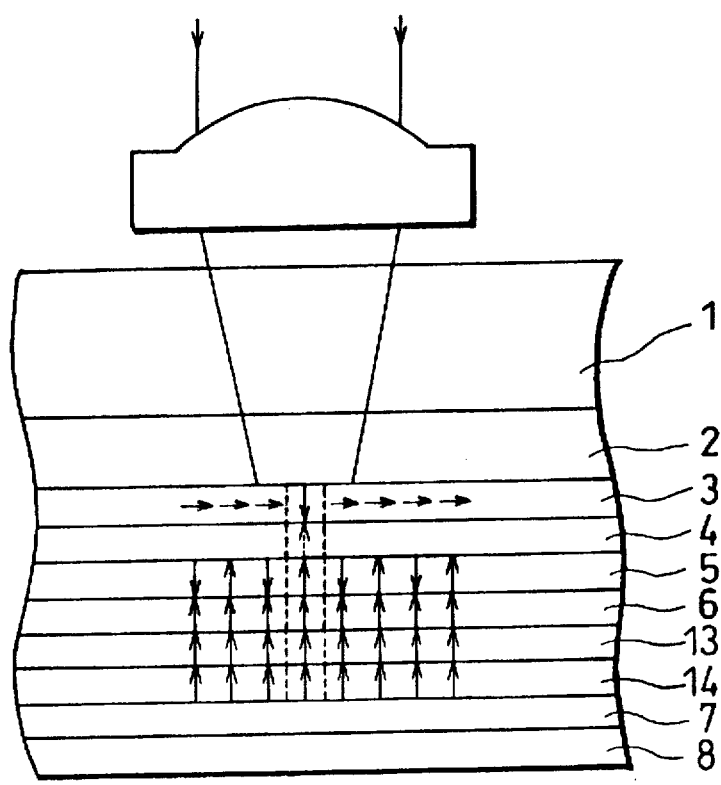
FIG. 9 is a view illustrating a schematic arrangement of a magneto-optical recording medium in accordance with eighth and ninth embodiments of the present invention, and states of magnetizations of the magneto-optical recording medium during a reproducing operation.
Figure 10:
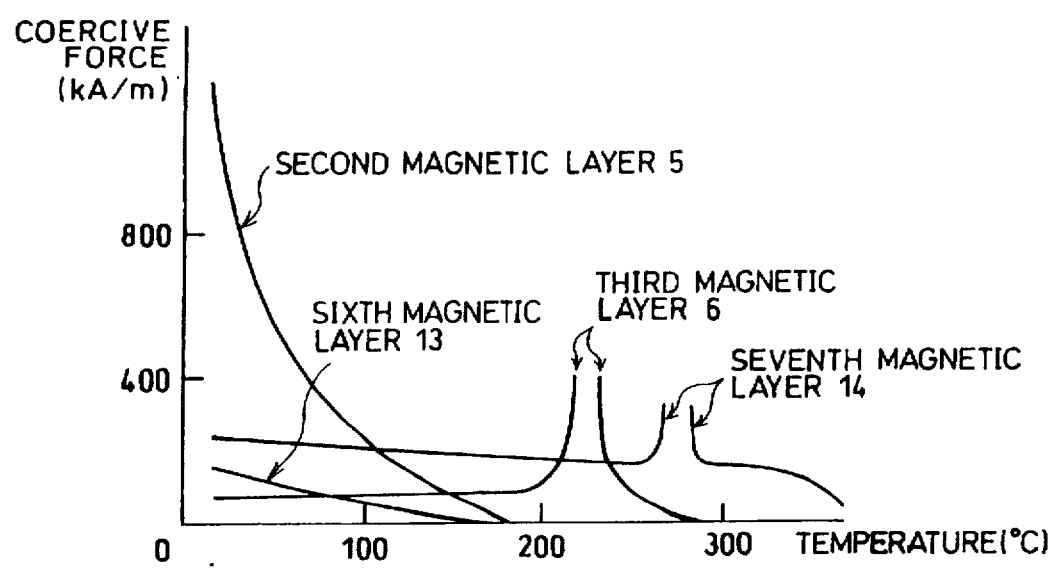
FIG. 10 is a graph illustrating correlations between temperature and respective coercive forces of second, third, sixth, and seventh magnetic layers of the magneto-optical recording medium illustrated in FIG. 9.
Figure 11:
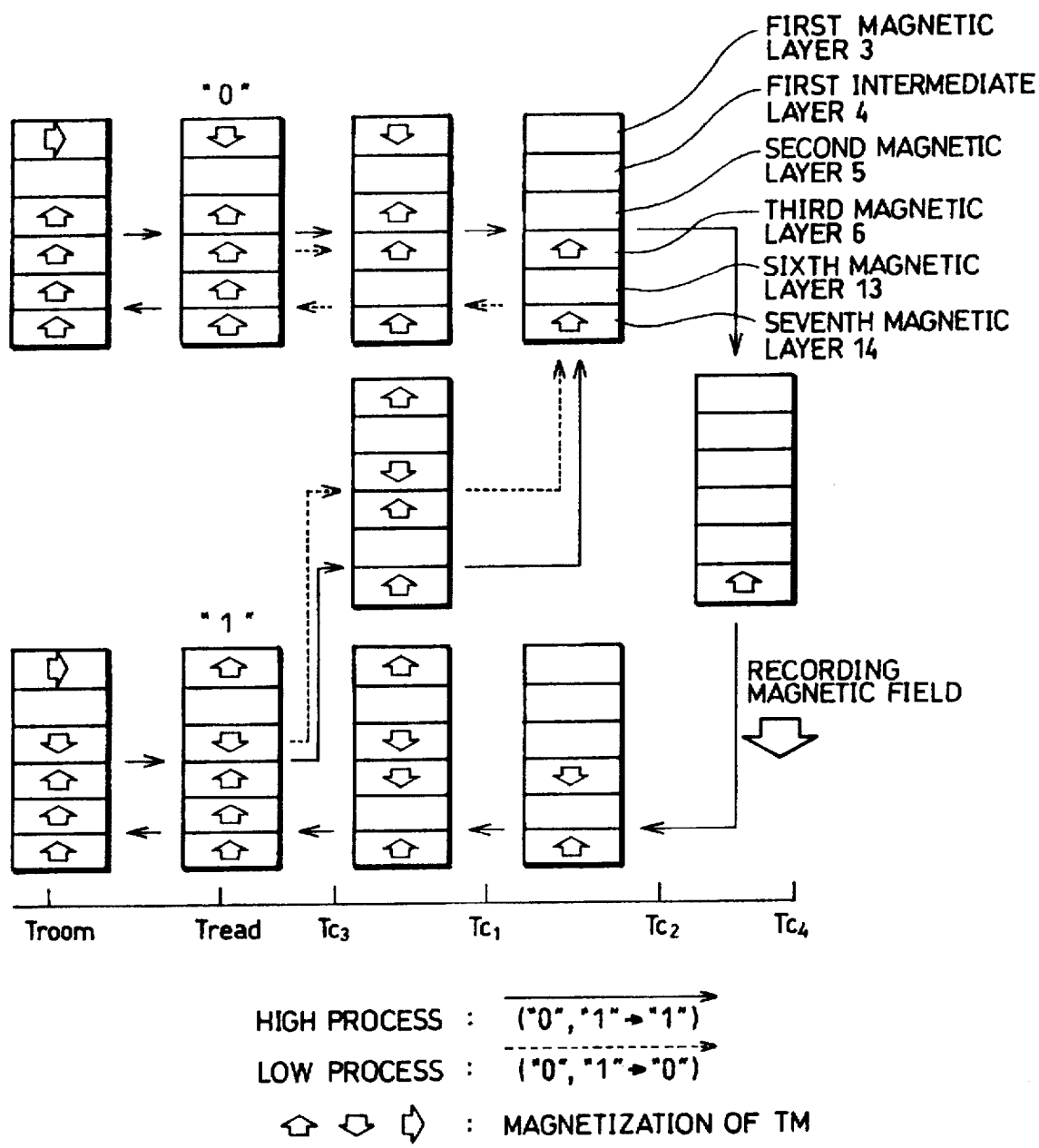
FIG. 11 is a view illustrating states of magnetizations of the respective magnetic layers of the magneto-optical recording medium shown in FIG. 9, for showing steps of a recording process with respect to the magneto-optical recording medium.

The following description will discuss an eighth embodiment of the present invention, while referring to FIGS. 9 through 11.

A magneto-optical recording medium of the present embodiment (hereinafter referred to as magneto-optical disk of sample #8) has the same configuration as that of sample #1, except for a sixth magnetic layer 13 and a seventh magnetic layer 14. Namely, the magneto-optical disk of sample #8 has the same transparent substrate 1, dielectric layer 2, first magnetic layer 3, first intermediate layer 4, second magnetic layer 5, third magnetic layer 6, protective layer 7, and overcoat layer 8 as those of the magneto-optical disk of sample #1, as illustrated in FIG. 9. FIG. 10 illustrates correlations between temperatures and coercive forces regarding the second magnetic layer 5, the third magnetic layer 6, the sixth magnetic layer 13, and the seventh magnetic layer 14. FIG. 11 illustrates steps of a recording process, showing magnetization states of these magnetic layers.

The same recording method as applied to the first embodiment was applied to the magneto-optical disk of sample #8, whereby the recording magnetic field Hw was utilized and the laser beam was modulated to the high power Ph and the low power Pl. Therefore, detailed description will be omitted regarding the recording method. Here, the following is to be noticed: before a recording operation, a magnetization of the third magnetic layer 6 is directed in the same direction as that of the seventh magnetic layer 14 by the intermediation of the sixth magnetic layer 13. In other words, the seventh magnetic layer 14 has the same function as that of the initializing magnetic field Hi, thereby allowing the initializing magnetic field Hi to be omitted.

The following description will depict the magneto-optical disk of sample #8, as an example of the magneto-optical recording medium of the present embodiment.

The sixth magnetic layer 13 is made of TbFeCo and has a thickness of 20 nm, while the seventh magnetic layer 14 is made of TbFeCo and has a thickness of 60 nm. Both the sixth and seventh magnetic layers 13 and 14 were formed by the simultaneous sputtering method using Tb, Fe, and Co targets, under the following conditions:

ultimate vacuum$\leq 2.0\times 10^{-4}$ Pa;

argon gas pressure=$6.5\times 10^{-1}$ Pa; and discharge power=300 W.

The sixth magnetic layer 13 is transition metal rich, and has the following properties:

Curie temperature $Tc_6$=160° C.; and coercive force $Hc_6$ at room temperature=160 kA/m.

The seventh magnetic layer 14 is rare-earth metal rich, and has the following properties:

Curie temperature $Tc_7$>300° C.;

compensation temperature $T_{comp,7}$=280° C.; and coercive force $Hc_7$ at room temperature=320 kA/m.

A recording operation was carried out with respect to the magneto-optical disk of sample #8, under the following conditions, so as to make clear a correlation between the reproduction-use laser power Pr and the carrier-to-noise ratio C/N:

strength of recording magnetic field Hw=32 kA/m;

high power Ph of laser beam=10 mW;

low power Pl of laser beam=5 mW; and recording bit length=0.5 μm.

As a result, the carrier-to-noise ratio C/N not lower than 45 dB was obtained when the reproduction-use laser power Pr fell in a range from 2 to 3.5 mW. Besides, the recording operation could be carried out without the initializing magnetic field Hi, compared with the magneto-optical disks of samples #1, #2, and #3.

Figure 12:
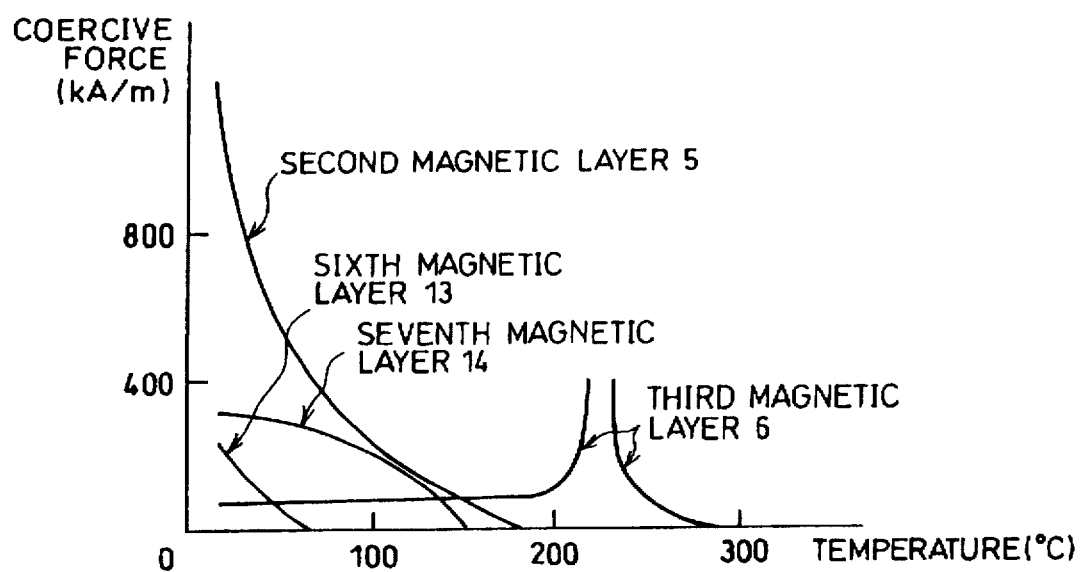
FIG. 12 is a graph illustrating correlations between temperature and respective coercive forces of second, third, sixth, and seventh magnetic layers of the magneto-optical recording medium illustrated in FIG. 9.
Figure 13:
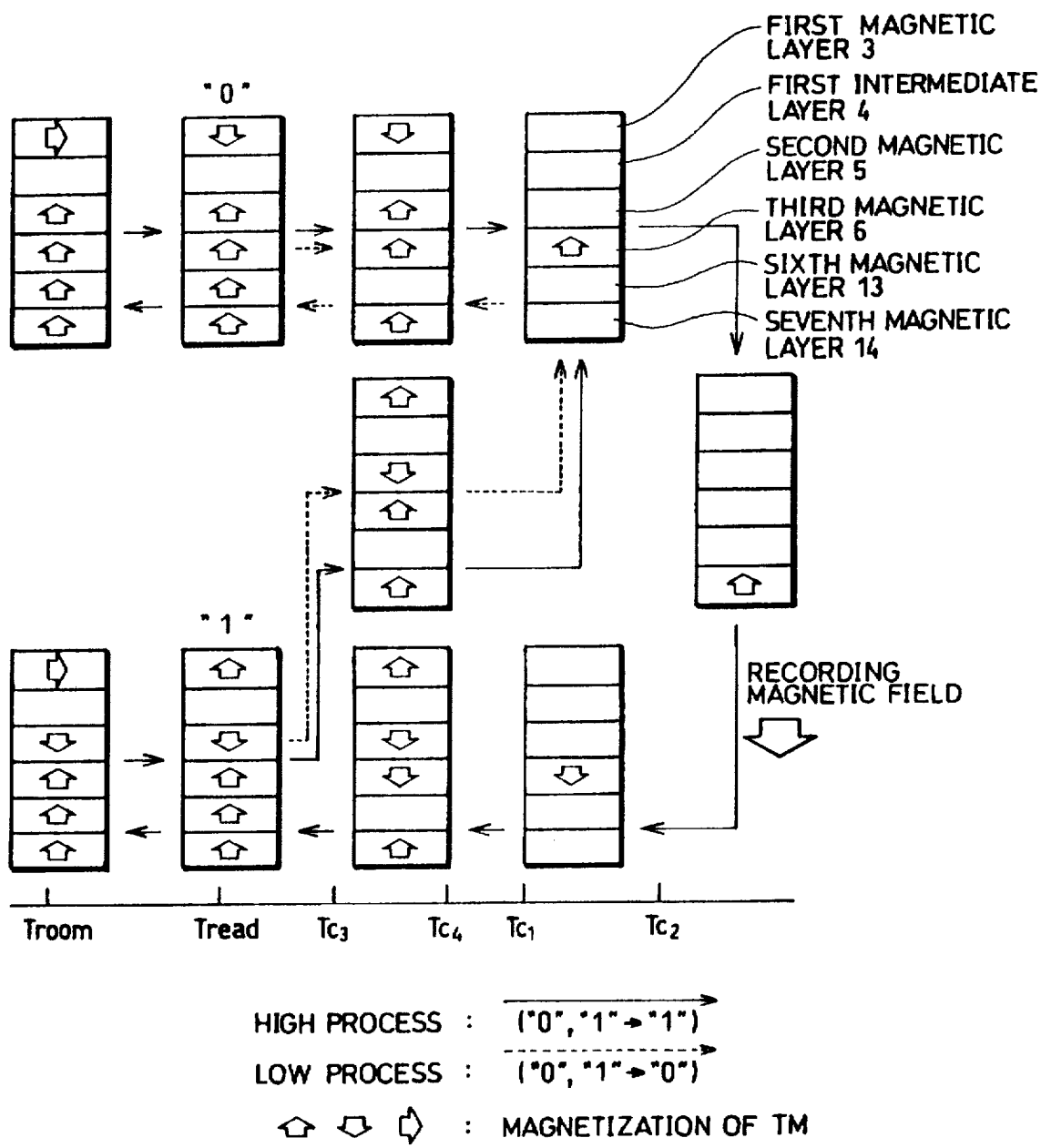
FIG. 13 is a view illustrating states of magnetizations of the respective magnetic layers of the magneto-optical recording medium shown in FIG. 9, for showing steps of a recording process with respect to the magneto-optical recording medium.

The following description will discuss a ninth embodiment of the present invention, while referring to FIGS. 9, 12, and 13.

A magneto-optical recording medium of the present embodiment (hereinafter referred to as magneto-optical disk of sample #9) has the same configuration as that of sample #1, except for a sixth magnetic layer 13 and a seventh magnetic layer 14. Namely, the magneto-optical disk of sample #9 has the same transparent substrate 1, dielectric layer 2, first magnetic layer 3, first intermediate layer 4, second magnetic layer 5, third magnetic layer 6, protective layer 7, and overcoat layer 8 as those of the magneto-optical disk of sample #1, as illustrated in FIG. 9. FIG. 12 illustrates correlations between temperatures and coercive forces regarding the second magnetic layer 5, the third magnetic layer 6, the sixth magnetic layer 13, and the seventh magnetic layer 14. FIG. 13 illustrates steps of a recording process, showing magnetization states of these magnetic layers.

The same recording method as applied to the first embodiment was applied to the magneto-optical disk of sample #9, whereby the recording magnetic field Hw was utilized and the laser beam was modulated to the high power Ph and the low power Pl. Therefore, detailed description will be omitted regarding the recording method. Here, the following is to be noticed: before a recording operation, a magnetization of the third magnetic layer 6 is directed in the same direction as that of the seventh magnetic layer 14 by the intermediation of the sixth magnetic layer 13. In other words, the seventh magnetic layer 14 has the same function as that of the initializing magnetic field Hi, thereby allowing the initializing magnetic field Hi to be omitted.

The following description will depict the magneto-optical disk of sample #9, as an example of the magneto-optical recording medium of the present embodiment.

The sixth magnetic layer 13 is made of DyFeCo and has a thickness of 20 nm, while the seventh magnetic layer 14 is made of DyFeCo and has a thickness of 60 nm. Both the sixth and seventh magnetic layers 13 and 14 were formed by the simultaneous sputtering method using Dy, Fe, and Co targets, under the following conditions:

ultimate vacuum$\leq 2.0\times 10^{-4}$ Pa;

argon gas pressure=$6.5\times 10^{-1}$ Pa; and discharge power=300 W.

The sixth magnetic layer 13 is transition metal rich, and has the following properties:

Curie temperature $Tc_6=100°$ C.; and coercive force $Hc_6$ at room temperature=160 kA/m.

The seventh magnetic layer 14 is rare-earth metal rich, and has the following properties:

Curie temperature $Tc_7=150°$ C.;

no compensation temperature; and coercive force $Hc_7$ at room temperature=240 kA/m.

A recording operation was carried out with respect to the magneto-optical disk of sample #9, under the following conditions, so as to make clear a correlation between the reproduction-use laser power Pr and the carrier-to-noise ratio C/N:

strength of recording magnetic field Hw=32 kA/m;

high power Ph of laser beam=10 mW;

low power Pl of laser beam=5 mW; and recording bit length=0.5 µm.

As a result, the carrier-to-noise ratio C/N not lower than 45 dB was obtained when the reproduction-use laser power Pr fell in a range from 2 to 3.5 mW. Besides, compared with the magneto-optical disk of sample #8, the seventh magnetic layer 14 has such a low Curie temperature $Tc_7$ that the seventh magnetic layer 14 is initialized by the recording magnetic field Hw. Therefore, there is no need to apply an initializing magnetic field to the seventh magnetic layer 14 for initialization.

Figure 14:
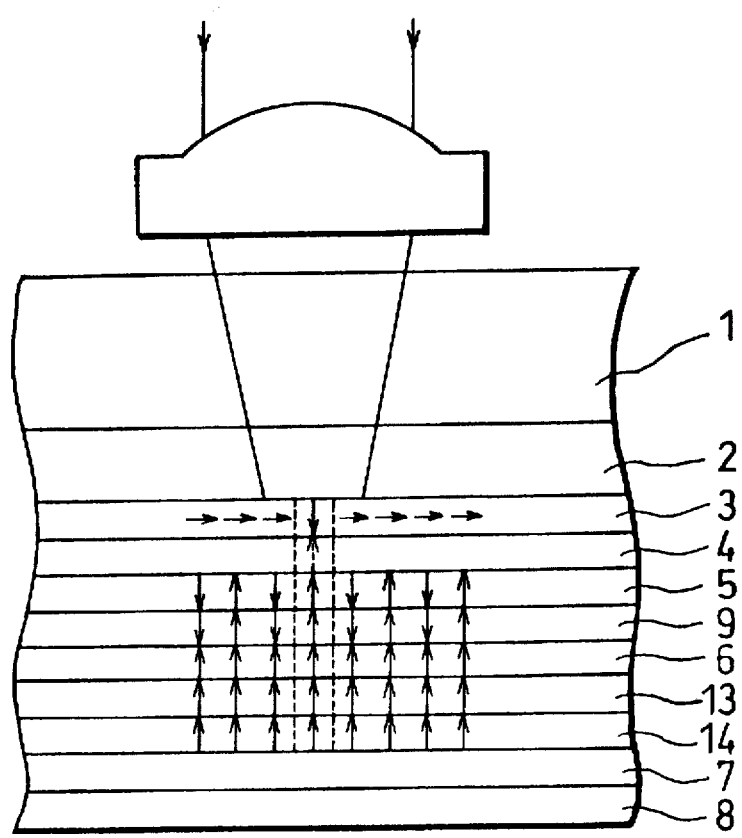
FIG. 14 is a view illustrating a schematic arrangement of a magneto-optical recording medium in accordance with a tenth embodiment of the present invention, and states of magnetizations of the magneto-optical recording medium during a reproducing operation.

The following description will discuss a tenth embodiment of the present invention, while referring to FIG. 14.

A magneto-optical recording medium of the present embodiment (hereinafter referred to as magneto-optical disk of sample #10) has the same configuration as that of either sample #8 or sample #9, except for a fourth magnetic layer 9. Namely, the magneto-optical disk of sample #10 has the same transparent substrate 1, dielectric layer 2, first magnetic layer 3, first intermediate layer 4, second magnetic layer 5, third magnetic layer 6, sixth magnetic layer 13, seventh magnetic layer 14, protective layer 7, and overcoat layer 8 as those of the magneto-optical disk of sample #8 or sample #9. The following description will depict the magneto-optical disk of sample #10, as an example of the magneto-optical recording medium of the present embodiment.

The fourth magnetic layer 9, which is made of GdFeCo and has a thickness of 50 nm, was formed by the simultaneous sputtering method using Gd, Fe, and Co targets, under the following conditions:

ultimate vacuum$\leq 2.0 \times 10^{-4}$ Pa;

argon gas pressure=$6.5 \times 10^{-1}$ Pa; and discharge power=300 W.

The fourth magnetic layer 9 is rare-earth metal rich, and has the following properties:

Curie temperature $Tc_4>300°$ C.;

compensation temperature $T_{comp4}=150°$ C.; and coercive force $Hc_4$ at room temperature=24 kA/m.

A recording operation was carried out with respect to the magneto-optical disk of sample #10, under the following conditions, so as to make clear a correlation between the reproduction-use laser power Pr and the carrier-to-noise ratio C/N:

strength of recording magnetic field Hw=24 kA/m;

high power Ph of laser beam=10 mW;

low power Pl of laser beam=5 mW; and recording bit length=0.5 µm.

As a result, the carrier-to-noise ratio C/N not lower than 45 dB was obtained when the reproduction-use laser power Pr fell in a range from 2 to 3.5 mW. Besides, the satisfactory result was obtained with the recording magnetic field Hw having a smaller strength, compared with the magneto-optical disks of sample #8 and sample #9.

Figure 15:
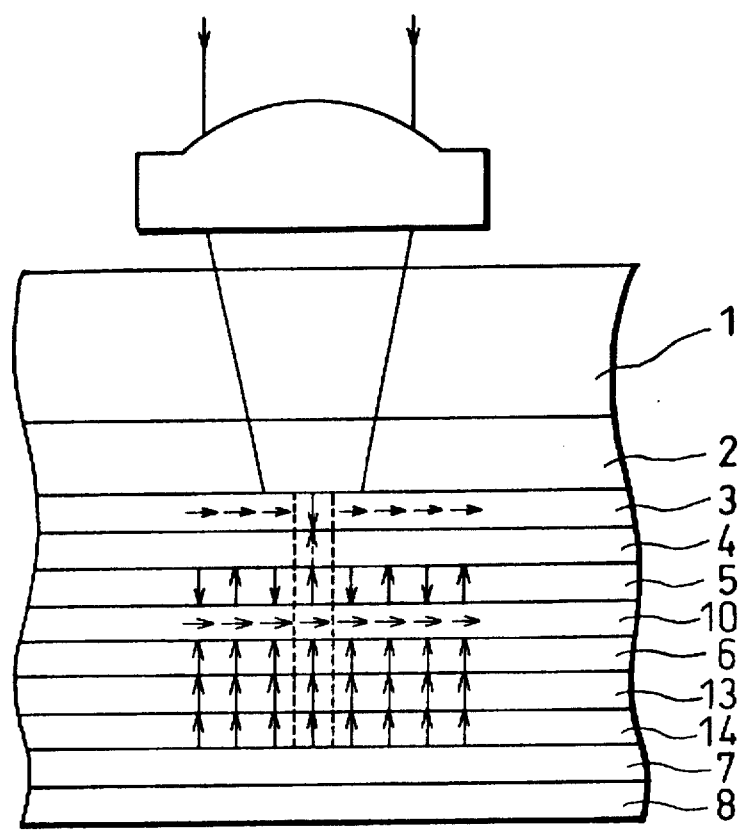
FIG. 15 is a view illustrating a schematic arrangement of a magneto-optical recording medium in accordance with an eleventh embodiment of the present invention, and states of magnetizations of the magneto-optical recording medium during a reproducing operation.

The following description will discuss an eleventh embodiment of the present invention, while referring to FIG. 15.

A magneto-optical recording medium of the present embodiment (hereinafter referred to as magneto-optical disk of sample #11) has the same configuration as that of either sample #8 or sample #9, except for a fifth magnetic layer 10. Namely, the magneto-optical disk of sample #11 has the same transparent substrate 1, dielectric layer 2, first magnetic layer 3, first intermediate layer 4, second magnetic layer 5, third magnetic layer 6, sixth magnetic layer 13, seventh magnetic layer 14, protective layer 7, and overcoat layer 8 as those of the magneto-optical disk of sample #8 or sample #9. The following description will depict the magneto-optical disk of sample #11, as an example of the magneto-optical recording medium of the present embodiment.

The fifth magnetic layer 10, which is made of GdFeCo and has a thickness of 50 nm, was formed by the simultaneous sputtering method using Gd, Fe, and Co targets, under the following conditions:

ultimate vacuum$\leq 2.0 \times 10^{-4}$ Pa;

argon gas pressure=$6.5 \times 10^{-1}$ Pa; and discharge power=300 W.

The fifth magnetic layer 10 is rare-earth metal rich, and has the following properties:

Curie temperature $Tc_5>300°$ C.;

compensation temperature $T_{comp5}=250°$ C.; and having an in-plane magnetization at room temperature.

A recording operation was carried out with respect to the magneto-optical disk of sample #11, under the following conditions, so as to make clear a correlation between the reproduction-use laser power Pr and the carrier-to-noise ratio C/N:

strength of recording magnetic field Hw=24 kA/m;

high power Ph of laser beam=10 mW;

low power Pl of laser beam=5 mW; and recording bit length=0.5 µm.

As a result, the carrier-to-noise ratio C/N not lower than 45 dB was obtained when the reproduction-use laser power Pr fell in a range from 2 to 3.5 mW. Besides, the satisfactory result was obtained with the recording magnetic field Hw having a smaller strength, compared with the magneto-optical disks of samples #8 and #9.

Figure 16:
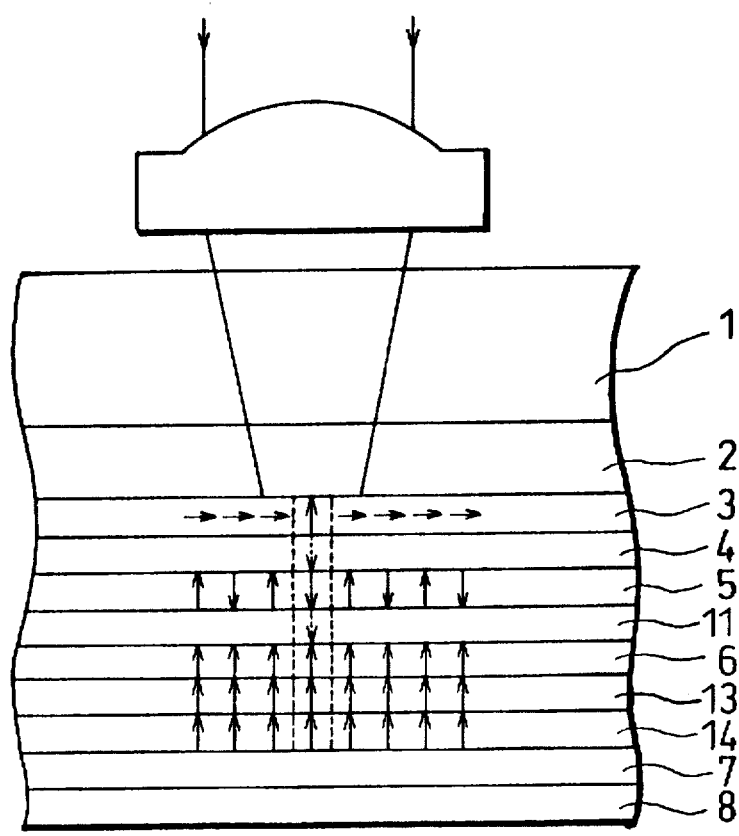
FIG. 16 is a view illustrating a schematic arrangement of a magneto-optical recording medium in accordance with a twelfth embodiment of the present invention, and states of magnetizations of the magneto-optical recording medium during a reproducing operation.

The following description will discuss a twelfth embodiment of the present invention, while referring to FIG. 16.

A magneto-optical recording medium of the present embodiment (hereinafter referred to as magneto-optical disk of sample #12) has the same configuration as that of either sample #8 or sample #9 except for a second intermediate layer 11. Namely, the magneto-optical disk of sample #12 has the same transparent substrate 1, dielectric layer 2, first magnetic layer 3, first intermediate layer 4, second magnetic layer 5, third magnetic layer 6, sixth magnetic layer 13, seventh magnetic layer 14, protective layer 7, and overcoat layer 8 as those of the magneto-optical disk of sample #8 or sample #9. The following description will depict the magneto-optical disk of sample #12, as an example of the magneto-optical recording medium of the present embodiment.

The second intermediate layer 11, which is made of AlN and has a thickness of 10 nm, was formed by the reactive sputtering method, under the following conditions:

ultimate vacuum ≦ $2.0×10^{-4}$ Pa;

nitrogen gas pressure= $3.×10^{-1}$ Pa; and discharge power=800 W.

A recording operation was carried out with respect to the magneto-optical disk of sample #12, under the following conditions, so as to make clear a correlation between the reproduction-use laser power Pr and the carrier-to-noise ratio C/N:

strength of recording magnetic field Hw=24 kA/m;

high power Ph of laser beam=9 mW;

low power Pl of laser beam=4 mW; and recording bit length=0.5 μm.

As a result, the carrier-to-noise ratio C/N not lower than 45 dB was obtained when the reproduction-use laser power Pr fell in a range from 2 to 3.5 mW. Besides, the satisfactory result was obtained with the recording magnetic field Hw having a smaller strength and with the laser beam having a lower intensity, compared with the magneto-optical disks of samples #8 and #9.

Figure 17:
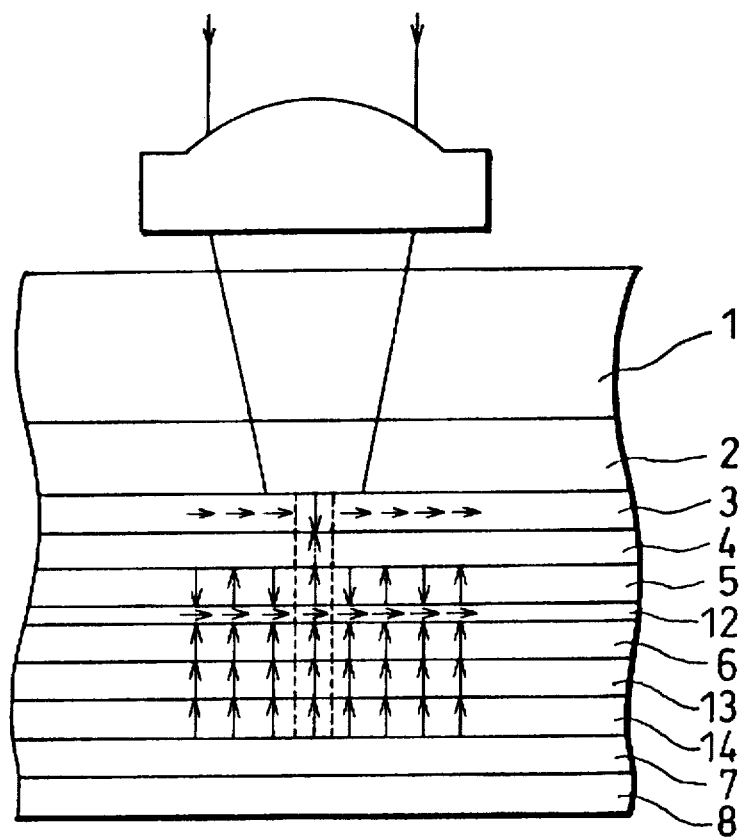
FIG. 17 is a view illustrating a schematic arrangement of a magneto-optical recording medium in accordance with a thirteenth embodiment of the present invention, and states of magnetizations of the magneto-optical recording medium during a reproducing operation.

The following description will discuss a thirteenth embodiment of the present invention, while referring to FIG. 17.

A magneto-optical recording medium of the present embodiment (hereinafter referred to as magneto-optical disk of sample #13) has the same configuration as that of either sample #8 or sample #9 except for an interface layer 12. Namely, the magneto-optical disk of sample #13 has the same transparent substrate 1, dielectric layer 2, first magnetic layer 3, first intermediate layer 4, second magnetic layer 5, third magnetic layer 6, sixth magnetic layer 13, seventh magnetic layer 14, protective layer 7, and overcoat layer 8 as those of the magneto-optical disk of sample #8 or sample #9. The following description will depict the magneto-optical disk of sample #13, as an example of the magneto-optical recording medium of the present embodiment.

The interface layer 12, which is made of either Gd or Fe and has a thickness of 1 nm, was formed by the sputtering method using either a Gd target or an Fe target, under the following conditions:

ultimate vacuum ≦ $2.0×10^{-4}$ Pa;

argon gas pressure= $6.5×10^{-1}$ Pa; and discharge power=300 W.

A recording operation was carried out with respect to the magneto-optical disk of sample #13, under the following conditions, so as to make clear a correlation between the reproduction-use laser power Pr and the carrier-to-noise ratio C/N:

strength of recording magnetic field Hw=24 kA/m;

high power Ph of laser beam=9 mW;

low power Pl of laser beam=4 mW; and recording bit length=0.5 μm.

As a result, the carrier-to-noise ratio C/N not lower than 45 dB was obtained when the reproduction-use laser power Pr fell in a range from 2 to 3.5 mW. Besides, the satisfactory result was obtained with the recording magnetic field Hw having a smaller strength and with the laser beam having a lower intensity, compared with the magneto-optical disks of samples #8 and #9.

In the above-described embodiments, glass was used as material for the substrate 1. Alternatively, chemically tempered glass, a so-called 2P layered glass substrate produced by providing an ultraviolet ray hardening resin film on a substrate made of glass or chemically tempered glass, polycarbonate (PC), polymethyl methacrylate (PMMA), amorphous polyolefin (APO), polystyrene (PS), polyvinyl chloride (PVC), epoxy, or the like may be used as material for the substrate 1.

The thickness of the dielectric layer 2 made of AlN is not restricted to 80 nm. The thickness of the transparent dielectric layer 2 is determined in consideration of the so-called Kerr effect enhancement, that is, a phenomenon that during a reproducing operation with respect to a magneto-optical recording medium a polar Kerr rotation angle of light from the first magnetic layer is augmented by making use of an interference effect of light. In order to achieve as high a carrier-to-noise ratio C/N as possible in reproduction, it is necessary to augment the polar Kerr rotation angle. For this reason, the thickness of the transparent dielectric layer 2 is set so that the greatest possible polar Kerr rotation angle is obtained.

In addition to the above-described role in relation to the Kerr effect enhancement, the dielectric layer 2 in combination with the protective layer 7 prevents the oxidization of the magnetic layers which are respectively made of rare earth-transition metal alloys. Furthermore, an AlN film may be obtained by a reactive DC (direct current) sputtering which is carried out by using an Al target and introducing $N_2$ gas or mixed gas of Ar and $N_2$. This sputtering method has an advantage that a higher film forming speed can be achieved compared with the RF (radio frequency) sputtering method.

Other than AlN, the following substances are suitable as material of the dielectric layer 2: SiN, AlSiN, AlTaN, SiAlON, TiN, TiON, BN, ZnS, $TiO_2$, $BaTiO_3$, $SrTiO_3$, and others. The use of SiN, AlSiN, AlTaN, TiN, BN, and ZnS, among others, ensures that magneto-optical disks which have an excellent moisture resistance are provided, since any of these substances does not contain oxygen in the composition thereof.

The respective compositions of the magnetic layers made of the rare earth-transition metal alloys are not restricted to those shown in the above embodiments. The same effects can be obtained by using any alloy which is a combination of at least one element selected from the rare-earth metal group composed of Gd, Tb, Dy, Ho, and Nd and at least one element selected from the transition metal group composed of Fe and Co. Furthermore, by adding at least one element selected from the group composed of Cr, V, Nb, Mn, Be, Ni, Ti, Pt, Rh, and Cu to the above alloys, the respective resistances to environment of the magnetic layers made of the rare earth-transition metal alloys are enhanced. Namely, the deterioration of the properties due to the oxidation of the material by moisture and oxygen can be prevented, thereby ensuring a reliable performance of the magneto-optical disk for a long period of time.

The respective film thicknesses of the magnetic layers are determined by considering the correlations among the materials used for the same, and the compositions thereof, and are not restricted to the thicknesses described above.

The material and film thickness of the interface layer are not restricted to those described above. Any rare-earth metal or any transition metal may be suitable as material of the interface layer, provided that the light modulation overwriting is smoothly carried out. As combinations of not less than two rare-earth metals as material for the interface layer, the following can be given as examples: Gd and Tb; Gd and Dy; Tb and Dy; Nd and Gd; Nd and Dy; and, Nd and Tb.

The thickness of the AlN film as the protective layer 7 was set to 30 nm in the above embodiments, but it is not restricted to as such. The film thickness of the protective layer 7 is preferably set to or above 1 nm and to or below 200 nm.

The thermal conductivity of the protective layer 7 as well as that of the dielectric layer 2 affects the recording sensitivity characteristics of the magneto-optical disk. Specifically, the recording sensitivity characteristic represents the laser power required for recording or erasion. For example, the recording sensitivity can be improved (recording or erasing operation can be carried out with a lower laser power) by making the protective layer 7 thinner. Normally, in order to extend the life of the laser, it is preferable to have relatively high recording sensitivity, and thus the thinner protective layer 7 is preferable.

In this sense also, AlN is suitable material. Because of its excellent moisture resistance, by using it as material of the protective film 7, it is possible to reduce the film thickness and to provide the magneto-optical disk which ensures a high recording sensitivity. When the protective layer 7 as well as the dielectric layer 2 is made of AlN as is the case with the present embodiments, it is possible to provide a magneto-optical disk which has excellent moisture resistance, and to enhance the productivity by producing the protective layer 7 and the dielectric layer 2 with the same material.

In considering the above objective and effect, other than AlN, the following substances which can be used also as material of the dielectric layer 2 are suitable as material of the protective layer 7: SiN, AlSiN, AlTaN, SiAlON, TiN, TiON, BN, ZnS, $TiO_2$, $BaTiO_3$, $SrTiO_3$, and others. The use of SiN, AlSiN, AlTaN, TiN, BN, and ZnS, among others, ensures that magneto-optical disks which have excellent moisture resistance are provided, since any of these substances does not contain oxygen in the composition thereof.

The magneto-optical disks of samples #1 through #13 are so-called single-sided type. Hereinafter a thin film composed of the layers from the dielectric layer 2 to the protective layer 7 is referred to as a recording medium layer. Accordingly, the magneto-optical disk of the single-sided type is composed of the substrate 1, the recording medium layer, and the overcoat layer. On the other hand, a magneto-optical disk composed of two substrates whereon recording medium layers are respectively laminated is called double-sided type, the two substrates being combined with an adhesive layer provided therebetween so that respective recording medium layers are oppositely provided.

As material for the adhesive layer, a polyurethane acrylate adhesive is especially suitable. The above adhesive has a combination of three types of hardening properties, namely, ultraviolet ray hardening, heat hardening, and anaerobic hardening. Therefore, this adhesive has an advantage that a portion of the adhesive shaded by the recording medium, to which the ultraviolet ray is not transmitted, can be hardened due to its heat and anaerobic hardening properties. Furthermore, with its high moisture resistance, a reliable performance of the magneto-optical disk can be ensured for a long period of time.

The magneto-optical disk of the single-sided type is suitable for the use with a compact magneto-optical recording and reproducing apparatus since the disk of the single-sided type has a thickness of half of that of the double-sided type. In contrast, the disk of the double-sided type is suitable for the use with a recording and reproducing apparatus requiring a large capacity since it is possible to record to and reproduce from the both sides.

Although the magneto-optical disks are used as examples of the magneto-optical recording medium in the above descriptions, the present invention is also applicable to a magneto-optical tape and a magneto-optical card.

As described above, the first magneto-optical recording medium of the present invention is characterized in comprising (1) a transparent substrate, (2) a first magnetic layer having an in-plane magnetization at room temperature, while coming to have a perpendicular magnetization with a temperature rise, (3) a first intermediate layer made of a non-magnetic substance, (4) a second magnetic layer having a perpendicular magnetization, and (5) a third magnetic layer having a perpendicular magnetization, having a coercive force than that of the second magnetic layer at room temperature, and having a Curie temperature higher than that of the second magnetic layer, which are provided in this order on the transparent substrate.

With the above-described arrangement, it is possible to provide a magneto-optical recording medium to which the light intensity modulation overwriting method is applicable, whose reproduction signal characteristics are superior, with respect to which reproduction is carried out even though it has recording bits whose each diameter is smaller than that of the light beam, and which is hence suitable for high density recording.

The second magneto-optical recording medium of the present invention, having the same arrangement as that of the first magneto-optical recording medium, is characterized in that (1) the second magnetic layer and the third magnetic layer are respectively made of rare earth-transition metal alloys and have ferrimagnetism, and (2) the second magnetic layer and the third magnetic layer have reverse polarities to each other at a temperature at which an area of the magneto-optical recording medium is heated so that information is reproduced from the heated area.

With this arrangement, it is possible to more smoothly carry out reproduction from recording bits whose each diameter is smaller than that of the light beam.

The third magneto-optical recording medium of the present invention, having the same arrangement as that of the first magneto-optical recording medium, is characterized in that the first intermediate layer is made of a transparent dielectric substance.

With this arrangement, it is possible to carry out reproduction from recording bits whose each diameter is smaller than that of the light beam, and liability can be enhanced.

The fourth magneto-optical recording medium of the present invention, having the same arrangement of the first magneto-optical recording medium, is characterized in that the first intermediate layer is made of a light reflecting metal.

With the above arrangement, it is possible to carry out reproduction from recording bits whose each diameter is smaller than that of the light beam, and productivity can be improved.

The fifth magneto-optical recording medium of the present invention, having the same arrangement of the first magneto-optical recording medium, is characterized in that the first intermediate layer includes a layer made of a transparent dielectric substance and a layer made of a light reflecting metal.

With the above arrangement, it is possible to carry out reproduction from recording bits whose each diameter is smaller than that of the light beam, and reproduction signal characteristics can be improved.

The sixth magneto-optical recording medium of the present invention, having the same arrangement of the first magneto-optical recording medium, is characterized in further including a fourth magnetic layer between said second and third magnetic layers, said fourth magnetic layer having a Curie temperature higher than that of said second magnetic layer.

With the above arrangement, it is possible to reduce the strength of the recording magnetic field for the light intensity modulation overwriting.

The seventh magneto-optical recording medium of the present invention, having the same arrangement of the first magneto-optical recording medium, is characterized in further including a fifth magnetic layer between said second and third magnetic layers, said fifth magnetic layer having an in-plane magnetization at room temperature and coming to have a perpendicular magnetization with a temperature rise.

With the above arrangement, it is possible to reduce the strengths of the recording magnetic field and the initializing magnetic field for the light intensity modulation overwriting.

The eighth magneto-optical recording medium of the present invention, having the same arrangement of the first magneto-optical recording medium, is characterized in further including a second intermediate layer made of a non-magnetic substance, between said second and third magnetic layers.

With the above arrangement, it is possible to reduce the strength of the recording magnetic field and the laser power for the light intensity modulation overwriting.

The ninth magneto-optical recording medium of the present invention, having the same arrangement of the first magneto-optical recording medium, is characterized in further including an interface layer made of a rare-earth metal or a transition metal, between said second and third magnetic layers.

With the above arrangement, it is possible to reduce the strength of the recording magnetic field and the laser power for the light intensity modulation overwriting.

The tenth magneto-optical recording medium of the present invention, having the same arrangement of the first magneto-optical recording medium, is characterized in further including a sixth magnetic layer and a seventh magnetic layer, said sixth magnetic layer having a Curie temperature lower than that of said seventh magnetic layer, said third magnetic layer having a first and second surfaces, said sixth and seventh magnetic layers being provided on a side of the first surface while said second magnetic layer being provided on a side of the second surface.

With the above arrangement, it is possible to omit the initializing magnetic field for the light intensity modulation overwriting.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium, which records information by applying a light beam with high power and low power within a recording magnetic field, comprising:

a transparent substrate;

a first magnetic layer having an in-plane magnetization at room temperature, while coming to have a perpendicular magnetization with a temperature rise;

a first intermediate layer made of a non-magnetic substance;

a second magnetic layer having a perpendicular magnetization; and a third magnetic layer having a perpendicular magnetization, having a coercive force smaller than a coercive force of said second magnetic layer at room temperature and having a Curie temperature higher than a Curie temperature of the second magnetic layer, said Curie temperature being set to such an extent that upon irradiation with a light beam with light power, the magnetization direction thereof is changed by the recording magnetic field and upon irradiation with a light beam with low power, the magnetization direction thereof is not changed by the recording magnetic field, wherein said first magnetic layer, said first intermediate layer, said second magnetic layer, and said third magnetic layer are provided in this order on said transparent substrate, and upon reproduction, the first magnetic layer has its magnetization direction determined by a magnetic field exerted by the second magnetic layer and upon recording, the first magnetic layer has substantially no affect on the second magnetic layer.

2. The magneto-optical recording medium as set forth in claim 1, wherein:

said second magnetic layer and said third magnetic layer are respectively made of rare earth-transition metal alloys and have ferrimagnetism; and said second magnetic layer and said third magnetic layer have reverse polarities to each other at a temperature at which an area of said magneto-optical recording medium is heated so that information is reproduced from the heated area.

3. The magneto-optical recording medium as set forth in claim 1, wherein:

said first magnetic layer has a Curie temperature higher than that of said second magnetic layer; and a temperature at which a transition from the in-plane magnetization to the perpendicular magnetization occurs in said first magnetic layer is lower than a Curie temperature of said second magnetic layer.

4. The magneto-optical recording medium as set forth in claim 1, wherein said third magnetic layer has a compensation temperature between room temperature and the Curie temperature of said third magnetic layer.

5. The magneto-optical recording medium as set forth in claim 1, wherein said first intermediate layer is made of a transparent dielectric substance.

6. The magneto-optical recording medium as set forth in claim 5, wherein said first intermediate layer is made of AlN.

7. The magneto-optical recording medium as set forth in claim 1, wherein said first intermediate layer is made of a metal which reflects light.

8. The magneto-optical recording medium as set forth in claim 7, wherein said first intermediate layer is made of Al.

9. The magneto-optical recording medium as set forth in claim 1, wherein said first intermediate layer includes a layer made of a transparent dielectric substance and a layer made of a metal which reflects light.

10. The magneto-optical recording medium as set forth in claim 9, wherein said first intermediate layer includes a layer made of AlN and a layer made of Al.

11. A magneto-optical recording medium as set forth in claim 1, further comprising a fourth magnetic layer between said second and third magnetic layers, said fourth magnetic layer having a Curie temperature higher than that of said second magnetic layer.

12. The magneto-optical recording medium as set forth in claim 11, wherein said fourth magnetic layer, made of a rare earth-transition metal alloy and having ferrimagnetism, is rare-earth metal rich at room temperature, has a compensation temperature between room temperature and the Curie temperature of said fourth magnetic layer, and has a coercive force smaller than the coercive force of said third magnetic layer at room temperature.

13. The magneto-optical recording medium as set forth in claim 12, wherein the compensation temperature of said fourth magnetic layer is lower than that of said third magnetic layer.

14. A magneto-optical recording medium as set forth in claim 1, further comprising a fifth magnetic layer between said second and third magnetic layers, said fifth magnetic layer having an in-plane magnetization at room temperature and coming to have a perpendicular magnetization with a temperature rise.

15. The magneto-optical recording medium as set forth in claim 14, wherein said fifth magnetic layer, made of a rare earth-transition metal alloy and having ferrimagnetism, has a Curie temperature higher than a Curie temperature of said second magnetic layer, is rare-earth metal rich at room temperature, and has a compensation temperature between room temperature and the Curie temperature of said fifth magnetic layer.

16. The magneto-optical recording medium as set forth in claim 15, wherein the compensation temperature of said fifth magnetic layer is higher than a compensation temperature of said third magnetic layer, while lower than the Curie temperature of said third magnetic layer.

17. A magneto-optical recording medium as set forth in claim 1, further comprising a second intermediate layer made of a non-magnetic substance, between said second and third magnetic layers.

18. The magneto-optical recording medium as set forth in claim 17, wherein said second intermediate layer is made of AlN.

19. A magneto-optical recording medium as set forth in claim 1, further comprising an interface layer made of a rare-earth metal, between said second and third magnetic layers.

20. A magneto-optical recording medium as set forth in claim 1, further comprising an interface layer made of a transition metal, between said second and third magnetic layers.

21. A magneto-optical recording medium as set forth in claim 1, further comprising a sixth magnetic layer and a seventh magnetic layer, said sixth magnetic layer having a Curie temperature lower than a Curie temperature of said seventh magnetic layer, said third magnetic layer having a first and second surfaces, said sixth and seventh magnetic layers being provided on a side of the first surface while said second magnetic layer being provided on a side of the second surface.

22. The magneto-optical recording medium as set forth in claim 21, wherein:

said sixth magnetic layer is made of a rare earth-transition metal alloy which is transition metal rich at room temperature; and said seventh magnetic layer is made of a rare earth-transition metal alloy which is rare-earth metal rich at room temperature, has a Curie temperature higher than the Curie temperature of said second magnetic layer, has a compensation temperature between room temperature and the Curie temperature of said seventh magnetic layer, and has a coercive force greater than the coercive force of said third magnetic layer and a coercive force of said sixth magnetic layer at room temperature.

23. The magneto-optical recording medium as set forth in claim 22, wherein the compensation temperature of said seventh magnetic layer is higher than a compensation temperature of said third magnetic layer.

24. The magneto-optical recording medium as set forth in claim 21, wherein: said sixth magnetic layer is made of a rare earth-transition metal alloy which is transition metal rich at room temperature; and said seventh magnetic layer is made of a rare-earth transition metal alloy which is rare-earth metal rich at room temperature, has a Curie temperature lower than the Curie temperature of said second magnetic layer, and has a coercive force greater than the coercive force of said third magnetic layer and a coercive force of said sixth magnetic layer at room temperature.

* * * * *